(12) United States Patent
Provins et al.

(10) Patent No.: US 12,480,155 B2
(45) Date of Patent: Nov. 25, 2025

(54) NICKING ENZYMES

(71) Applicant: LumiraDx UK Ltd., London (GB)

(72) Inventors: Jarrod Provins, San Clemente, CA (US); Victor Perez, Imperial Beach, CA (US); Daiwei Shen, Vista, CA (US); Anthony Farina, Carlsbad, CA (US); Bryan Kraynack, La Jolla, CA (US)

(73) Assignee: LumiraDx UK Ltd., London (GB)

( * ) Notice: Subject to any disclaimer, the term of this patent is extended or adjusted under 35 U.S.C. 154(b) by 924 days.

(21) Appl. No.: 17/618,949

(22) PCT Filed: Jun. 9, 2020

(86) PCT No.: PCT/GB2020/051390
§ 371 (c)(1),
(2) Date: Dec. 14, 2021

(87) PCT Pub. No.: WO2020/254784
PCT Pub. Date: Dec. 24, 2020

(65) Prior Publication Data
US 2022/0403459 A1    Dec. 22, 2022

Related U.S. Application Data

(60) Provisional application No. 62/864,837, filed on Jun. 21, 2019.

(30) Foreign Application Priority Data

Oct. 23, 2019 (GB) .................................... 1915346

(51) Int. Cl.
*C12Q 1/6844* (2018.01)
*C12N 9/22* (2006.01)
*C12Q 1/6848* (2018.01)
*C12Q 1/6851* (2018.01)

(52) U.S. Cl.
CPC ............. *C12Q 1/6844* (2013.01); *C12N 9/22* (2013.01); *C12Q 1/6848* (2013.01); *C12Q 1/6851* (2013.01)

(58) Field of Classification Search
CPC .................... C12N 9/22; C12Y 301/21–21007
See application file for complete search history.

(56) References Cited

U.S. PATENT DOCUMENTS

| | | | |
|---|---|---|---|
| 6,191,267 B1 | 2/2001 | Kong et al. | |
| 9,617,586 B2 * | 4/2017 | Maples | G01N 30/72 |
| 10,059,748 B2 | 8/2018 | Dunia et al. | |
| 2009/0017453 A1 | 1/2009 | Maples et al. | |
| 2016/0273001 A1 | 9/2016 | Geijsen et al. | |
| 2017/0183714 A1 | 6/2017 | Shen et al. | |

FOREIGN PATENT DOCUMENTS

| | | |
|---|---|---|
| CN | 101952459 A | 1/2011 |
| CN | 104357546 A | 2/2015 |
| CN | 107002129 A | 8/2017 |
| CN | 111742057 A | 10/2020 |
| EP | 2181196 B1 | 8/2013 |
| JP | 2016535999 A | 11/2016 |
| JP | 2017524375 A | 8/2017 |
| TW | 201903148 A | 1/2019 |
| TW | 201930600 A | 8/2019 |
| WO | WO-2017/027835 A1 | 2/2017 |
| WO | WO-2017093326 A1 | 6/2017 |
| WO | WO-2018002649 A1 | 1/2018 |
| WO | WO-2018181903 A1 | 10/2018 |
| WO | WO-2019135074 A1 | 7/2019 |

OTHER PUBLICATIONS

Rachel Green et al., "Transformation of chemically competent E. coli" In: "Biomembranes: transport theory: cells and model membranes" Jan. 1, 2013, Elsevier, Academic Press, NL, XP055516979, ISBN: 978-0-12-805382-9 vol. 529, pp. 329-336.
Japanese Office Action for JP Patent Application No. 2021-576158 mailed Jul. 9, 2024, 17 pages.
Wataru Fujii "Generation of genome-modified mice using engineered endonucleases—Precise genome modification in mouse embryos" Journal of Clinical and Experimental Medicine, vol. 252, No. 2, (2015) pp. 159-163.
Office Action for Chinese Patent Application No. 201811064700.1 dated Mar. 8, 2024.
Chinese Office Action for Application No. 202080045449.3 issued on Jan. 1, 2025.
Alexandrov et al. (2012) "DNA breathing dynamics distinguish binding from nonbinding consensus sites for transcription factor YY1 in cells," Nucl. Acids Res. 40(20):10116-10123.
Green et al. (2013) "Transformation of Chemically Competent E. coli" Biomembranes: Transport theory: cells and model Membranes 529:329-336.
Kachalova et al. (2008) "Structural Analysis of the Heterodimeric Type IIS Restriction Endonuclease R.BspD6I Acting as a Complex between a Monomeric Site-specific Nickase and a Catalytic Subunit," Journal of Molecular Biology 384(2):489-502.
Von Hippel et al. (2013) "Fifty years of DNA 'breathing': Reflections on old and new approaches," Biopolymers 99(12):923-954.
Lee Jaesuk et al. "Prime editing with genuine Cas9 nickases minimizes unwanted indels", Nature Communications, vol. 14, No. 1, Mar. 30, 2023, 11 pages.

* cited by examiner

*Primary Examiner* — Thane Underdahl
(74) *Attorney, Agent, or Firm* — Goodwin Procter LLP

(57) ABSTRACT

Disclosed is a composition comprising a nicking enzyme and a water-soluble rubidium salt, and a method of performing a reaction catalysed by a nicking enzyme including the presence of a water-soluble rubidium salt in the reaction.

24 Claims, 17 Drawing Sheets

Specification includes a Sequence Listing.

NICKING ENZYMES

This application is the National Stage Application of PCT/GB2020/051390, filed on Jun. 9, 2020, which claims priority to U.S. Provisional Patent Application No. 62/864,837, filed on Jun. 21, 2019 and Great Britain Patent Application No 1915346.9, filed on Oct. 23, 2019, both of which are incorporated by reference for all purposes as if fully set forth herein.

SEQUENCE LISTING

The instant application contains a Sequence Listing which has been submitted electronically in ASCII format and is hereby incorporated by reference in its entirety. The ASCII copy, created on Jul. 11, 2022, is named LDX-017WOUS_SL.txt and is 2,697 bytes in size.

FIELD OF THE INVENTION

The present invention relates to a composition useful for performing reactions catalysed by a nicking enzyme, and to a method of performing a reaction catalysed by a nicking enzyme.

BACKGROUND OF THE INVENTION

Many nicking enzymes are known to those skilled in the art. Like restriction endonucleases, nicking enzymes recognise short specific DNA sequences and cleave the DNA strand at a fixed position relative to the recognition sequence. However, unlike restriction endonucleases, nicking enzymes cleave only one strand of a double stranded polynucleotide. A non-exhaustive list of examples of nicking enzymes includes: Nb.BsmI, Nb.Bts, Nt.Alwl, Nt.BbvC, Nt.BstNBI, and Nt.Bpu101. The latter enzyme is commercially available from ThermoFisher Scientific; the others are available from e.g. New England Biolabs. The lower case letter "b" is or "t" in the name of the nicking enzyme denotes whether the enzyme makes a nick in the bottom or top strand respectively (the accepted convention being that the top strand runs from free 5' end on the left to free 3' end on the right, with the bottom strand in the opposite orientation).

Nicking enzymes are useful in laboratories as a research tool, but also find application in certain nucleic acid amplification techniques, which can be used for (inter alia) detection of nucleic acid sequences of interest and/or diagnosis of disease or health conditions. An example of this is disclosed in WO 2018/002649 and in EP 2181196.

It is known that, in order for any enzyme to catalyse reactions at near optimal rate, it is necessary for the reaction conditions to be suitable for the enzyme. This includes parameters such as temperature, pH and concentration of salts/metals. For example, for many nicking enzymes, it is conventional to provide reaction conditions which include a metallic cation such as $Mg^{2+}$, typically at a concentration in the range 5 to 20 mM.

WO2017/093326 discloses a method of transducing a cell using a transduction buffer. The transduction buffer comprises "a transduction compound", one or more salts, and a further osmolality-inducing component. The one or more salts may comprise a rubidium salt, such as rubidium chloride or rubidium gluconate. The "transduction compound" is "any compound that enhances transduction of a molecule of interest into a cell".

SUMMARY OF THE INVENTION

In a first aspect, the invention provides a composition comprising a nicking enzyme and a water-soluble rubidium salt.

The composition may be provided in a container as a dried (e.g. freeze-dried) solid, to be dissolved in a defined volume of distilled water or aqueous solution, or may be provided already as an aqueous solution comprising nicking enzyme and one or more rubidium salts. A dried solid will be understood to mean a solid composition having a water content of less than 5% w/w, preferably less than 3% w/w, more preferably less than 1% w/w water. The solution will typically be useful as an ingredient or constituent for inclusion in a reaction mixture for performing a reaction to be catalysed by the nicking enzyme, which reaction may be, for example, a nucleic acid amplification reaction, as described below.

It is conventional to provide such reaction mixture constituents in concentrated form, such that upon dilution (e.g. by mixing with other constituents of the reaction mixture), a desired concentration of the constituents is achieved.

Typically, for example, a concentrated enzyme-containing constituent may be provided at a 10× concentration, and is diluted ten-fold when in the complete reaction mixture. However, a solution in accordance with the invention could be provided at anything from 1× to about 100× concentration.

The final concentration of nicking enzyme in the complete reaction mixture would typically be in the range 0.001 to 5 U/ul, whilst the final concentration of rubidium ions in the complete reaction mixture would typically be in the range 5 to 50 mM, preferably 10 to 50 mM, more preferably 10 to 30 mM. Accordingly, in a 10× concentrated solution of a composition in accordance with the invention, for example, the concentration of nicking enzyme might be in the range 0.01 to 50 U/ul, whilst the concentration of Rb ions might be in the range 5 to 500 mM, preferably 100 to 500 mM, more preferably in the range 100 to 300 mM.

Co-pending patent application (PCT/GB2019/050005; WO2019/135074) by the inventors, unpublished at the priority date of the present application, incidentally discloses one particular example of a composition comprising a nicking enzyme reaction mixture comprising, inter alia, rubidium sulfate. Accordingly, in one preferred embodiment, the composition is other than the composition or aqueous solution consisting of the following constituents: 12.5 mM $MgSO_4$, 90 mM Tris-HCl (pH 8.5), 15 mM $NH_4CH_3CO_2$, 15 mM $Na_2SO_4$, 5 mM DTT, 0.2 mg/ml BSA, 0.02% Triton X-100, 20 mM $Rb_2SO_4$, 10 mM L-threonine, and 0.008 U/µl nicking endonuclease.

In one embodiment, the composition is other than a composition or aqueous solution which consists of the constituents noted immediately above in the same relative proportions but present in different absolute concentrations from those stated.

In other embodiments the composition is other than a composition comprising 12.5 mM $MgSO_4$, 90 mM Tris-HCl (pH 8.5), 15 mM $NH_4CH_3CO_2$, 15 mM $Na_2SO_4$, 5 mM DTT, 0.2 mg/ml BSA, 0.02% Triton X-100, 20 mM $Rb_2SO_4$, 10 mM L-threonine, and 0.008 U/µl nicking endonuclease, in combination with one or more additional constituents.

It will be understood by those skilled in the art that the above disclaimers encompass those compositions in which the stated concentrations of the various reagents might vary by an insignificant amount (e.g. a numerical value of +/−0.5%) from the concentration stated in the disclaimed composition e.g. due to lack of accuracy in preparing the composition.

The composition of the invention is other than as disclosed in WO2017/093326. The prior art document does not explicitly disclose a composition comprising a nicking enzyme. Moreover, it is an essential requirement in WO2017/093326 that the buffer composition disclosed therein comprises a transduction compound. In contrast, in the preferred embodiments of the present invention, the composition does not comprise a transduction compound as defined in WO2017/093326. WO2017/093326 refers to the beta-lactamase assay (as described therein) as being suitable to determine whether a substance is a "transduction compound".

Examples of transduction compounds disclosed in WO2017/099326 include non-detergent sulfobetaine (NDSB), non-detergent carbobetaines (NDCBs), pentanoic acid, n-butylamine and compounds according to the general formula I, disclosed in WO2017/093326 at page 11 thereof.

The inventors have found that many different rubidium salts provide a beneficial effect on the activity of nicking enzymes, and the invention is thus not limited to use of any one particular rubidium salt (it being understood that the rubidium salt is of reasonable solubility in water, and otherwise acceptable for use in combination with a nicking enzyme). Rubidium salts having good solubility in water include: rubidium bromide, chloride, fluoride and iodide; acetate, chromate, formate, hydroxide, hydrogen carbonate, nitrate, selenite and sulfate. Nevertheless, certain rubidium salts have been found to be especially convenient, and these include the following: rubidium sulfate; rubidium nitrate; and rubidium halides (especially rubidium chloride).

The composition may be formed in situ as part of a reaction mixture (e.g. to perform a polynucleotide nicking reaction, which reaction may itself form part of a DNA amplification reaction, such as NEAR or STAR), or the composition may be ready-formed as a component in a kit. "NEAR" is an acronym for "Nicking Enzyme Amplification Reaction". "STAR" is an acronym for "Selective Temperature Amplification Reaction".

In 'NEAR' (e.g. disclosed in US2009/0017453 and EP 2,181,196), forward and reverse primers (referred to in US2009/0017453 and EP 2,181,196 as "templates") hybridise to respective strands of a double stranded target and are extended. Further copies of the forward and reverse primers (present in excess) hybridise to the extension product of the opposite primer and are themselves extended, creating an "amplification duplex". Each amplification duplex so formed comprises a nicking site towards the 5' end of each strand, which is nicked by a nicking enzyme, allowing the synthesis of further extension products. The previously synthesised extension products can meanwhile hybridise with further copies of the complementary primers, causing the primers to be extended and thereby creating further copies of the "amplification duplex". In this way, exponential amplification can be achieved.

The initial primer/target hybridisation event needed to trigger the amplification process takes place whilst the target is still substantially double stranded: it is though that the initial primer/target hybridisation takes advantage of localised dissociation of the target strands—a phenomenon known as "breathing" (see Alexandrov et al., 2012 Nucl. Acids res. and review by Von Hippel et al., 2013 Biopolymers 99 (12), 923-954). Breathing is the localised and transient loosening of the base pairing between strands of DNA. The melting temperature (Tm) of the initial primer/target heteroduplex is typically much lower than the reaction temperature, so the tendency is for the primer to dissociate, but transient hybridisation lasts long enough for the polymerase to extend the primer, which increases the Tm of the heteroduplex, and stabilises it.

The amplification stage in NEAR is performed isothermally, at a constant temperature. Indeed, it is conventional to perform both the initial target/primer hybridisation, and the subsequent amplification rounds, at the same constant temperature, usually in the range 54 to 56° C.

Like NEAR, STAR is also an amplification reaction which requires the use of a nicking enzyme. Unlike NEAR, however, STAR is not performed isothermally and involves a deliberate reduction in the temperature of the reaction from a (relatively elevated) initial temperature, and produces greater yield of specific amplification product. The technique is described in detail in WO2018/002649.

The composition of the present invention, in whatever form (e.g. dried; in solution ready to use; in solution in concentrated form), may be provided if desired as an aliquot or a plurality of aliquots. The aliquot or aliquots may be provided, for example, in an Eppendorf™ tube, or other stoppered vial or container.

Conveniently, the composition of the invention may be provided as part of a kit (e.g. a kit for performing a nucleic acid amplification reaction which involves a nicking step catalysed by a nicking enzyme). The kit may contain one or more aliquots of the composition, each aliquot being provided in a stoppered vial or other container. The kit will typically comprise a package, such as a cardboard or plastic package, comprising the one or more aliquots of the composition of the invention, and typically also including written instructions for use of the kit.

The composition of the invention may conveniently comprise additional components which may be useful, for example, in optimising and/or preserving the enzyme activity of the nicking enzyme. Such additional components may comprise one or more buffers, amino acids, reducing agents, protective excipients, and carbohydrates.

Preferred buffers for inclusion in the composition of the invention include, Trishydrochloride, Tris hemisulfate, Tris EDTA, Tris Base, Tris EGTA, N,N-Bis(2-hydroxyethyl) glycine, N,N-Bis(2-hydroxyethyl)-3-amino-2-hydroxypropanesulfonic acid, 4-(2-hydroxyethyl)-1-piperazinepropanesulfonic acid, N-(2-hydroxyethyl)piperazine-N'-(4-butanesulfonic acid), 4-(2-hydroxyethyl)piperazine-1-ethanesulfonic acid, orthoboric acid, 3-(N-Morpholino)propanesulfonic acid hemisodium salt, 3-(N-Morpholino)propanesulfonic acid sodium salt, 3-(N-Morpholino)propanesulfonic acid, Piperazine-1,4-bis(2-hydroxypropanesulfonic acid) dihydrate, N-Tris(hydroxymethyl)methyl]-3-aminopropanesulfonic acid, 3-(N-tris[hydroxymethyl]methylamino)-2-hydroxypropanesulfonic acid, N-[Tris(hydroxymethyl)methyl]glycine, sodium chloride, sodium sulfate, sodium acetate, sodium hydride, sodium nitrite, sodium nitrate, sodium borate, boric acid, potassium sulfate, potassium acetate, potassium borate, potassium chloride, potassium nitrite, potassium nitrate, magnesium sulfate, magnesium chloride, magnesium acetate, ammonium chloride, ammonium sulfate, ammonium acetate, ethylenediaminetetraacetic acid, ethylene glycol-bis(2-aminoethylether)-N,N,N',N'-tetraacetic acid, citric acid, or a combination thereof.

Preferred carbohydrates include fructose, Ficoll®, hydroxyethyl (heta) starch, pentosan polysulfate, polyphosphoric acid, poly-L-glutamic acid, sucrose, trehalose, maltotriose, dextrans, mannitol, sorbitol, glucose, mannose, galactose, lactose, maltose, lactulose, raffinose, melezitose, 1,6-anhydroglucose, k-carrageenan, microcrystalline cellulose, polyethylene glycols, polyvinylpyrrolidone, leucrose, kestose, stachyose, verbascose, nystose, maltodextrin, cyclodextrins, isomaltooligosaccharide, fructooligosaccharides, inulin, or a combination thereof.

Preferred amino acids include glycine, alanine, valine, leucine, isoleucine, methionine, phenylalanine, serine, threonine, glutamine, citrulline, lysine, histidine, taurine, arginine, or a combination thereof.

Preferred reducing agents include, 1,4-dithioerythritol, DL-dithiothreitol, tributylphosphine, Tris(2-carboxyethyl) phosphine hydrochloride, or a combination thereof.

Preferred protective excipients include, bovine serum albumin, alpha-casein, globulins, alpha-lactalbumin, human serum albumin, heat shock proteins, valosin-containing protein, alpha-crystallin, gelatin, lactate dehydrogenase, lysozyme, myoglobin, fibroin, ovalbumin, resveratrol, hydroxybutyrate, octanoic acid, quinone-tryptophan derivates, chitosan, CHAPS, n-octylglucoside, polysorbate 20, polysorbate 80, oleic acid, sodium glycolate, Triton x-100, Tween® 20, Tween® 80, Thesit® (polyoxyethylene lauryl ether), decanoyl-n-methylglucamide, octanoyl-n-methylglucamide, IGEPAL® CA-630 (octylphenoxy poly(ethylenoxy)ethanol), Tergitol, and hydrophobic salts.

Conveniently, the composition will be such that when diluted and/or mixed with a suitable volume of distilled water, the composition will have a buffer concentration in the range 1 mM to 150 mM (typically 5-100 mM), and a typical pH in the range 7.0 to 9.0, more preferably 7.5 to 8.0.

The various aspects of the present invention preferably relate to nicking enzymes which include the prefix letter 'N' in their formal title. This indicates that the enzyme is a "true" nicking endonuclease, as opposed to nicking enzymes which are associated inside cells with DNA methyltransferases. This latter group of nicking enzymes introduce a nick near unpaired bases of G-T mismatched pairs, which arise after deamination of a cytosine base in a sequence, which is recognised by DNA methyltransferase. Nicking enzymes of this second sort are denoted by the prefix letter "V" (which stems from the name of the best-characterised enzyme of this type, "Vsr"—Very Short Patch Repair). In preferred embodiments of the invention, the nicking enzyme is not a "V"-type nicking enzyme.

In a second aspect, the invention provides a method for performing a reaction catalysed by a nicking enzyme, the method comprising the step of contacting a nicking enzyme with a double stranded oligonucleotide or polynucleotide substrate having a recognition site for the nicking enzyme, in the presence of a water-soluble rubidium salt, in aqueous conditions compatible with the nicking enzyme, so as to effect at least one single-stranded nick or cut in the double stranded oligonucleotide or polynucleotide substrate. Typically, the method will additionally comprise the extension of the free 3' end of the nicked strand by a DNA polymerase (especially a strand-displacing polymerase), adding nucleotides to the free 3' end. The oligonucleotide will preferably comprise at least 17 nucleotides, more preferably at least 19 nucleotides. Any sequence longer than 30 nucleotides is considered, for present purposes, as a polynucleotide. The polynucleotide may be as long as 1 kb, or even 10 or 20 kb long.

In one embodiment, the method of the invention is performed in the absence of a cell, especially in the absence of a cell to be transduced.

Nicking enzymes are used in a number of circumstances. For example, there are nucleic acid amplification techniques which utilise nicking enzymes. Such techniques include "NEAR" ("Nicking Enzyme Amplification Reaction", e.g. as described in US 2009/017453 and EP 2181196) and "STAR" ("Selective Temperature Amplification Reaction", as described in WO 2018/002649). Thus, in a preferred embodiment of the second aspect of the invention, the reaction is part of or comprised within a nucleic acid amplification reaction, such as NEAR or STAR.

In particular, the inventors have found that the inclusion of rubidium in the reaction mixture of an amplification reaction, such NEAR or STAR, improves the sensitivity of the reaction and increases reproducibility (reducing the spread of results obtained from replicate samples), in a way which was not observed with other metal cations.

In addition, these results were seen to be exerted via effects on the activity of the nicking enzyme rather than effects on other enzyme components (specifically, DNA polymerase) of the nucleic acid amplification reaction mixture.

Other constituents that may usefully be included in the composition of the invention may, as mentioned above, help preserve the activity of the nicking enzyme, or optimise conditions for the nicking enzyme and/or assist in the optimisation of conditions for performance of a nucleic acid amplification reaction which comprises the use of the composition of the invention.

Such constituents may include one or more, preferably two or more, more preferably three or more, and most preferably four or more of the following:

(a) a magnesium salt (to act as a co-factor for a polymerase used in an amplification reaction), especially magnesium sulfate, typically at a concentration of 10-15 mM;

(b) a buffer (e.g. TrisHCl), typically at a concentration in the range 1-100 mM, and at a pH in the range 7.0-9.0;

(c) a reducing agent/anti-oxidant, such as dithiothreitol (DTT), typically at a concentration of 1-15 mM; other reducing agents are also suitable (see above);

(d) a detergent, such as TritonX-100, typically present at about 0.01% v/v;

(e) a sodium salt, such as sodium sulfate, typically at a concentration in the range 1-20 mM; an ammonium salt, such as ammonium sulfate, typically at a concentration in the range 1-25 mM;

(g) an acetate, such as sodium acetate, typically at a concentration in the range 1-25 mM; and (h) a protective excipient and/or a carbohydrate.

It will be apparent that, optionally, a single constituent may perform multiple roles in the composition. For example, ammonium acetate may act as both an ammonium salt (f) and as an acetate (g).

The typical concentration values given above refer to a "1x" concentration: i.e. the concentration in a final reaction mixture. It will be appreciated that the concentration of the constituents may be increased to produce a "stock" solution of, for example, 5× or 10×.

The various aspects of the invention will now be further described by way of illustrative example and with reference to the accompanying drawing figures, in which:

(FIG. 4a) or cycle number (FIG. 4b);

EXAMPLES

Figure 1:
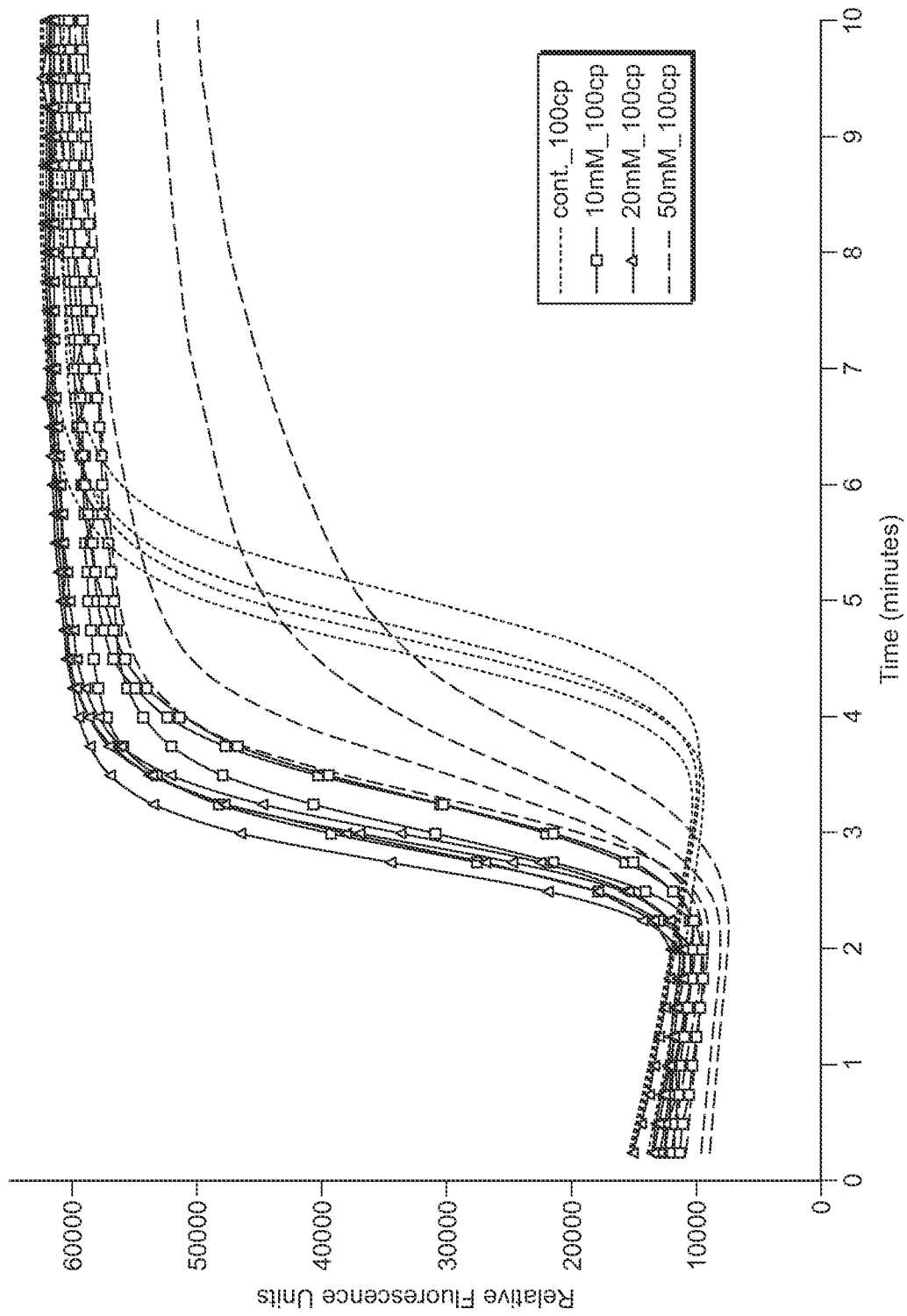
FIG. 1 is a graph of relative fluorescence units against time (minutes), showing the results of STAR DNA amplification assays performed without rubidium sulfate in the reaction mixture ("cont.") or in the presence of 10, 20 or 50 mM rubidium sulfate.

Example 1: Enhancement of Amplification Reactions by Rubidium Sulphate

Investigations into various STAR buffer components have resulted in the discovery of the enhancing qualities of rubidium compounds which demonstrate improved assay speed and consistency for all reactions in the STAR method (WO 2018/002649).

Enzymes, Oligonucleotides, and Target

*Chlamydia trachomatis* (Ct) was used as the target for rubidium testing. *Chlamydia trachomatis* Serovar J (ATCC VR-886) genomic DNA was acquired from American Type Culture Collection (Manassas, VA). The open reading frame 6 region of the cryptic plasmid was amplified with primers STARctF61a2 (SEQ ID NO: 1 5'-CGACTCCATATG-GAGTCGATTTCCCCGAATTAmG-3') and STARctR61c2 (SEQ ID NO: 2 5'-GGACTCCACACG-GAGTCCTTTTTCCTTGTTTAmC-3'). The resulting DNA template was detected using a molecular beacon STARctMB1 (SEQ ID NO:3, 5'-FAM/ccattCCTTGTT-TACTCGTATTTTTAGGaatgg/BHQ1-3') as described in EP No. 0728218. Bst X DNA polymerase was purchased from Qiagen (Beverly, MA). Nt.BstNBI nicking endonuclease was purchased from New England BioLabs (Ipswich, MA) described in U.S. Pat. No. 6,191,267. Rubidium sulfate was purchased from Sigma Aldrich (St. Louis, MO).

Oligonucleotides and molecular beacons were synthesized by Integrated DNA Technologies (Coralville, IA). The general features of the primers used in the STAR reactions are as described in WO 2018/002649.

Amplification Conditions and Procedure

The general method for STAR reactions are as described in WO 2018/002649. The STAR mixture contained two primers, polymerase, and nicking enzyme (referenced above). Reactions were performed in a final volume of 25 µl, including 1.0 µM of the forward primer, 0.5 µM of the reverse primer, 0.25 µM molecular beacon, 10 µl STAR Master Mix and 5 µl DNA sample. STAR master mix contained the following reagents; 12 mM $MgSO_4$, 90 mM Tris-HCl (pH 8.5), 300 µM each dNTPs, 20 mM $(NH_4)_2SO_4$, 15 mM $Na_2SO_4$, 2 mM. DTT, 0.01% Triton X-100, 15 U nicking endonuclease, 60 U polymerase. To the STAR master mix was added rubidium sulfate at 10, 20 or 50 mM in the test samples, or no rubidium sulfate in the control group ("cont." in FIG. 1), Each reaction mixture contained 100 copies of the target primers. The temperature of the reactions was controlled, with a relatively high initiation temperature followed by a gradual drop over time, for optimal STAR activity. The initiation phase, primarily involving polymerase activity, was at the elevated temperature of 60° C. for 15 seconds. An exponential amplification phase, in which both the polymerase and nicking enzyme are highly active, was achieved by dropping the temperature −0.4 degrees Celsius every 15 seconds for a total of 10 minutes. Amplification and STAR product detection were performed with the Agilent Mx3005P qPCR apparatus (Agilent).

Every reaction had a pre-incubation to allow the reagents to come to reaction temperature and to test the effect that salts had on amplification kinetics, enzyme performance, and signal fluorescence.

The amplification system, isothermal and STAR, relies on two main enzymes for functionality, the polymerase and nicking enzyme. Either or both enzymes can be optimized to a selected temperature which results in significant performance improvements, a benefit that the selective temperature amplification reaction utilizes. Further, enzymes require co-factors for modulation and activity, for example, magnesium is a requirement for polymerase activity. Investigations into alternative metal ions and cofactors by the inventors led to the discovery that rubidium improved STAR reactions compared to those which did not contain rubidium sulphate (FIG. 1). An optimal concentration of rubidium is recommended for maximal performance improvements. FIG. 1 demonstrates that rubidium sulphate improved STAR reactions between a concentration of 10 to 20 mM. A concentration of 50 mM, was detrimental to amplification, slowing the reaction (although it is noted that, at 50 mM rubidium sulfate, the replicate sample results are still more tightly grouped than with the control group). Not to the limit the inventors to any particular theory, it is believed the sulfate anion was the cause of slower reactions at the concentration of 50 mM rubidium sulfate. (Note that the $Mg^{2+}$ ions in the reaction mix are required for the activity of the polymerase).

Example 2: Enhancement of Amplification Reactions by Other Rubidium Salts

Figure 2A:
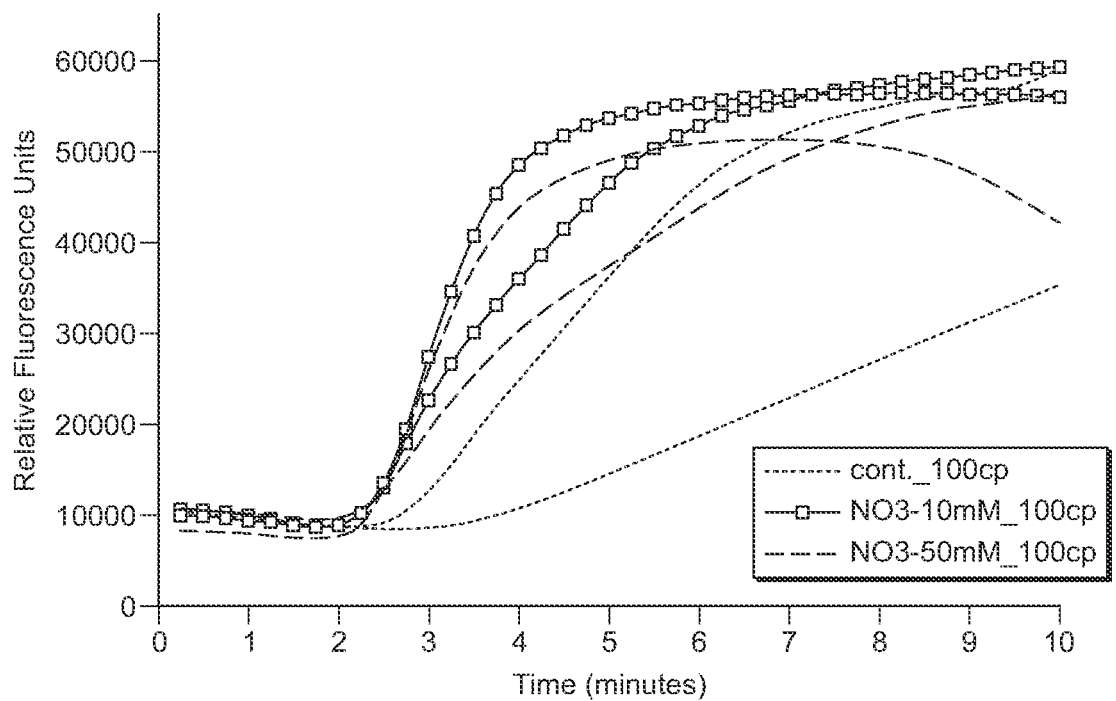
FIGS. 2a and 2b are graphs of relative fluorescence (arbitrary units) against time (minutes) showing the results of STAR DNA amplification assays performed in the absence of a rubidium salt ("cont.") or in the presence of 10 or 50 mM of (FIG. 2a) rubidium nitrate or (FIG. 2b) rubidium chloride.
Figure 2B:
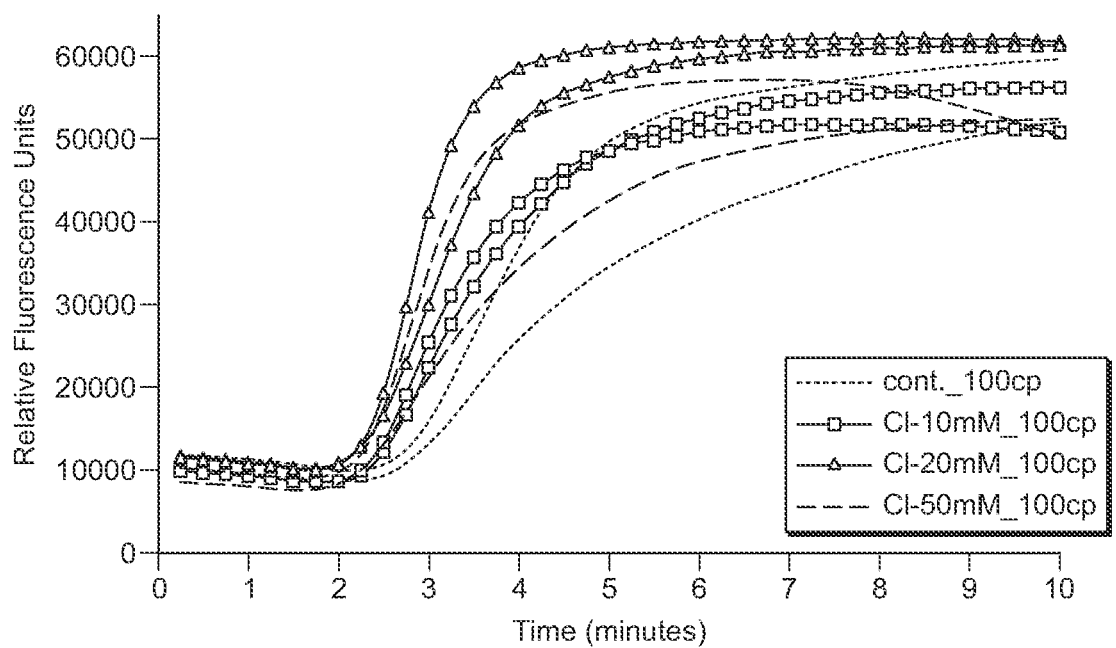

To further demonstrate that it was the rubidium cation that specifically improved STAR, other rubidium salts were tested. The experiments were conducted as described in Example 1 above, but using rubidium nitrate or rubidium chloride in place of rubidium sulfate. The results are shown in FIG. 2, Rubidium nitrate and rubidium chloride demonstrated similar performance improvements as rubidium sulphate. Unsurprisingly, different tolerances for the anion of the salt was demonstrated but all three rubidium salts showed improvement in assay performance, in a range of 10 to 50 mM.

Without limiting the inventors to any theory, it is believed that the amplification improvements can be attributed to at least one characteristic. In most nucleic acid amplification reactions, a polymerase initiates strand extension in a reaction. Polymerases are known to require catalytic ions to help guide polymerase selection of the correct nucleotide for incorporation into the growing nucleic acid strand during strand extension, underscoring the importance of the delicate conformational changes for polymerase efficiency and fidelity. If rubidium could serve as a better catalytic ion, than ions currently known in the art, for polymerase activity, one might possibly expect improved fidelity resulting in increased assay sensitivity. When rubidium is added to STAR reactions, however, this was not observed. What became apparent was (i) improved reaction speed and (ii) significantly tighter replicates (i.e. greater reproducibility and less variability). This observed improvement could result from improvement of the exponential phase of the reaction. The reaction exponential phase relies on a nicking endonuclease for product turnover. Faster turnover would increase speed and tighten replicates as product is more consistently made. This would suggest that rubidium modulates or improves the nicking endonuclease This was surprising and not previously known in the art to the best knowledge of the inventors.

Example 3: Results Using Polymerase Activity Assay

The hypothesis outlined above was tested by performing a polymerase activity assay (Example 3) and a nicking enzyme activity assay (Example 4) in the presence of rubidium.

Figure 3:
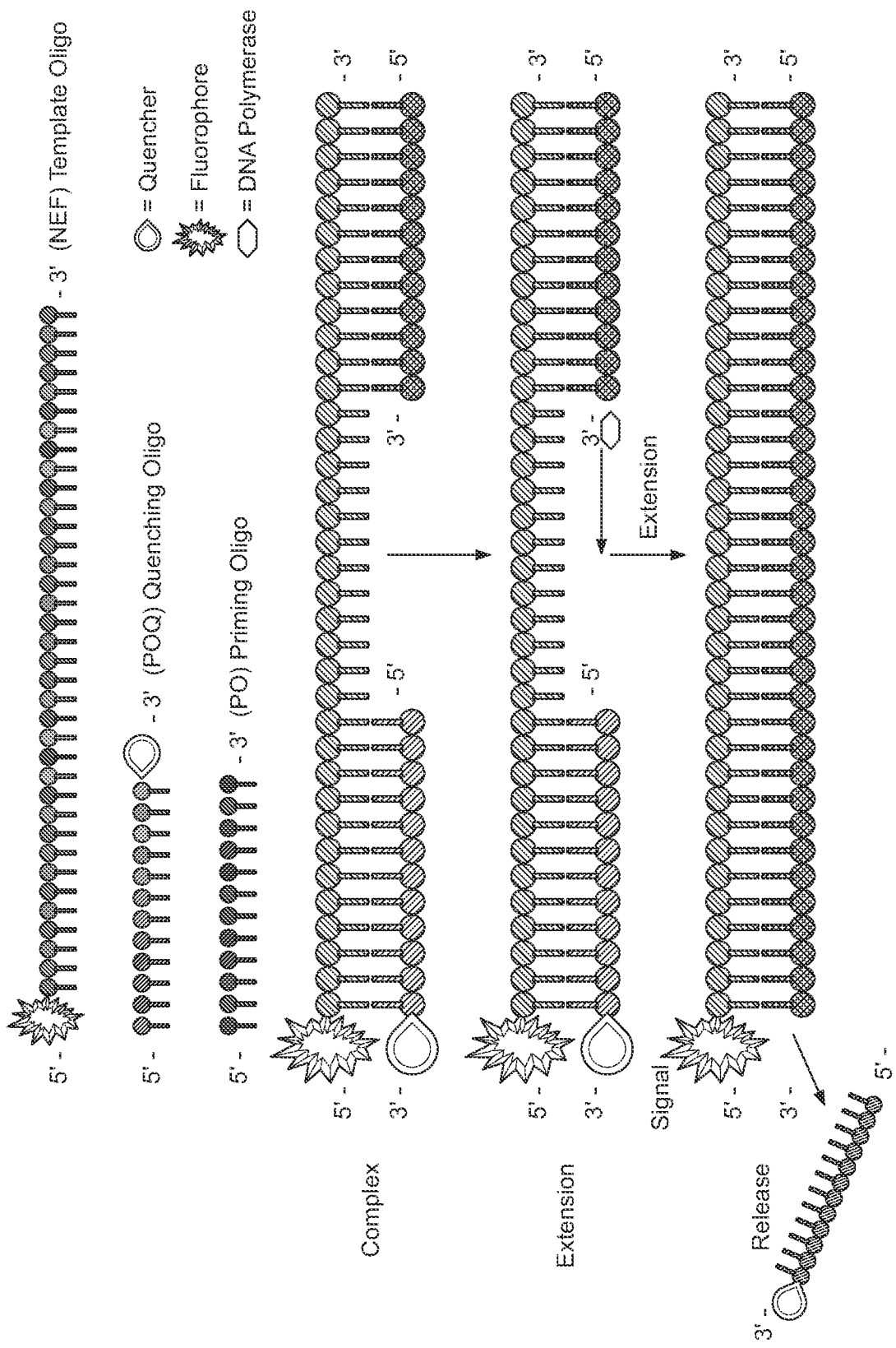
FIG. 3 is a schematic representation of the Polymerase Activity Assay ("PAA") performed by the inventors.

Polymerase Activity Assay Design, Enzymes, and Oligonucleotides:

Synthetic oligonucleotides for the Polymerase Activity Assay (PAA) were synthesized by Integrated DNA Technologies (Coralville, IA). The design consists of three oligonucleotides; the template oligo (NEF), (SEQ ID NO: 4 5'-/56-FAM/ACCGCGCGCACCGAGTCTGTCGGCAGCACCGCT-3'), priming oligo (PO), (SEQ ID NO: 5 5'-AGCGGTGCTGCCGACA-3'), and quenching oligo (POQ), (SEQ ID NO: 6 5'-GGTGCGCGCGGT/3BHQ_1/-3'). Together these three oligonucleotides form a complex in solution each with unique functions, as shown in FIG. 3. The NEF has a 5' fluorophore, POQ has a 3' quenching moiety that absorbs the photons released by the 5' template oligo fluorophore. The PO serves as the initiation site for a strand displacement polymerase to extend and displace the quenching oligo allowing for fluorescence to be generated due to the quenching oligo no longer being in proximity to the template oligo. Highly active strand displacing polymerases generate a fluorescent signal at an increased rate compared to less active polymerases or those that lack stand displacing activity.

Polymerase Activity Assay Conditions

The basic PAA mixture contains a template oligo (NEF) with a 5'-FAM modification, a priming oligo (PO) which anneals to the template's 3-end, a quenching oligo (POQ) with a 3'-BHQ1 modification which anneals to the template's 5'-end, and a polymerase (referenced above). The reactions were performed in a final volume of 25 µl, including 0.2 µM NEF, 0.3 µM PO, 0.7 µM POQ, and 1×PAA Master Mix. At a 1× concentration, the PAA master mix contained the following reagents; 12.5 mM $MgSO_4$, 90 mM Tris-HCl (pH 8.5), 300 µM each dNTPs, 15 mM $NH_4CH_3CO_2$, 15 mM $Na_2SO_4$, 5 mM DTT, 0.2 mg/ml BSA, 0.02% Triton X-100, 15 mM $Rb_2SO_4$, 10 mM L-Threonine, and 0.03 U/µl polymerase. The reactions were run using a STAR temperature profile as previously described (Example 1). The PAA was performed with the Agilent Mx3005P qPCR apparatus (Agilent). Every reaction had a pre-reaction incubation to allow the reagents to come to temperature to test the effect of the selected temperature profile and occlude any variation as reactions heated up. Each reaction assessed amplification kinetics, enzyme performance, and signal fluorescence.

Figure 4A:
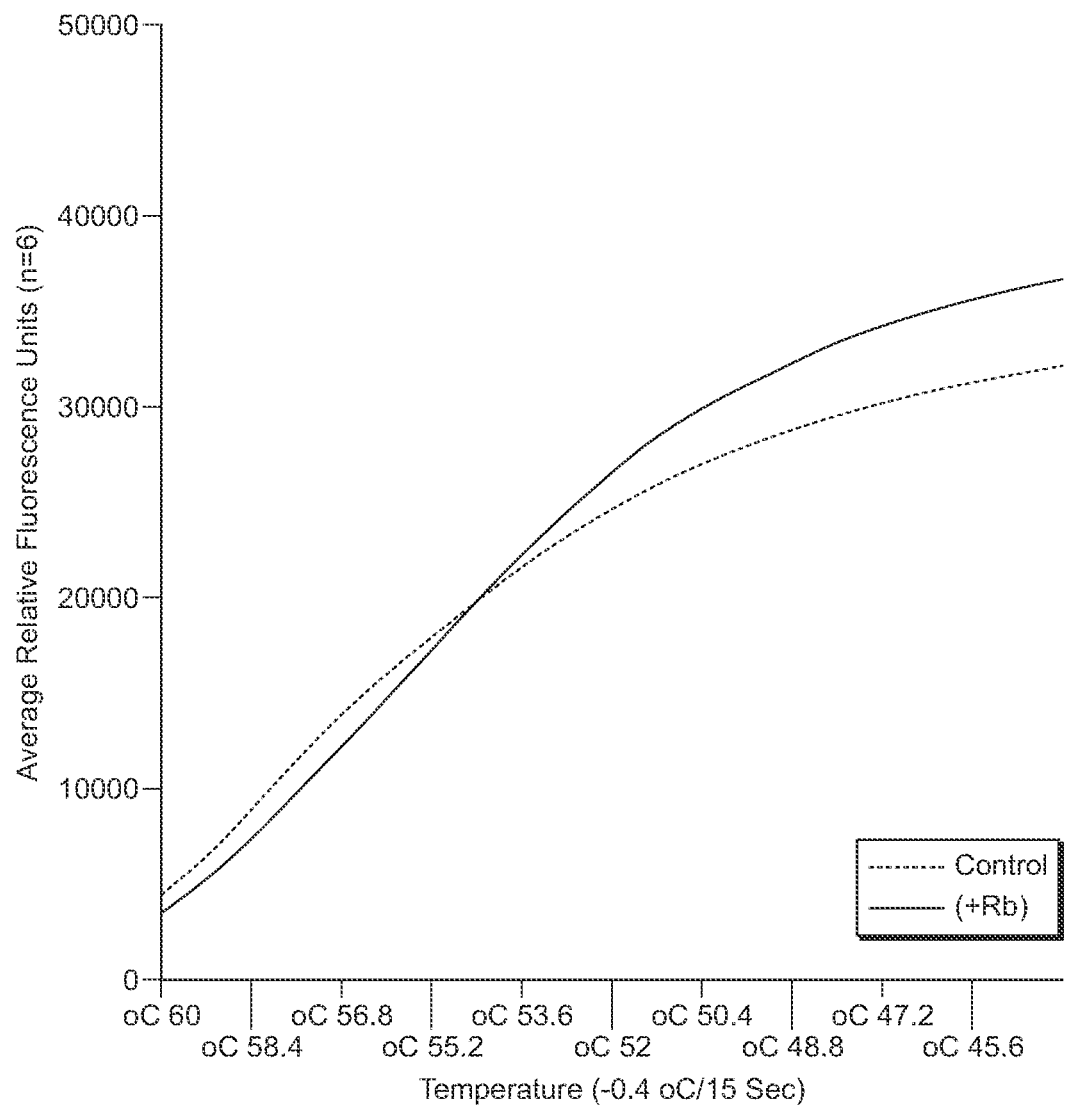
FIGS. 4a and 4b are graphs of relative fluorescence (arbitrary units) against temperature in ° C.
Figure 4B:
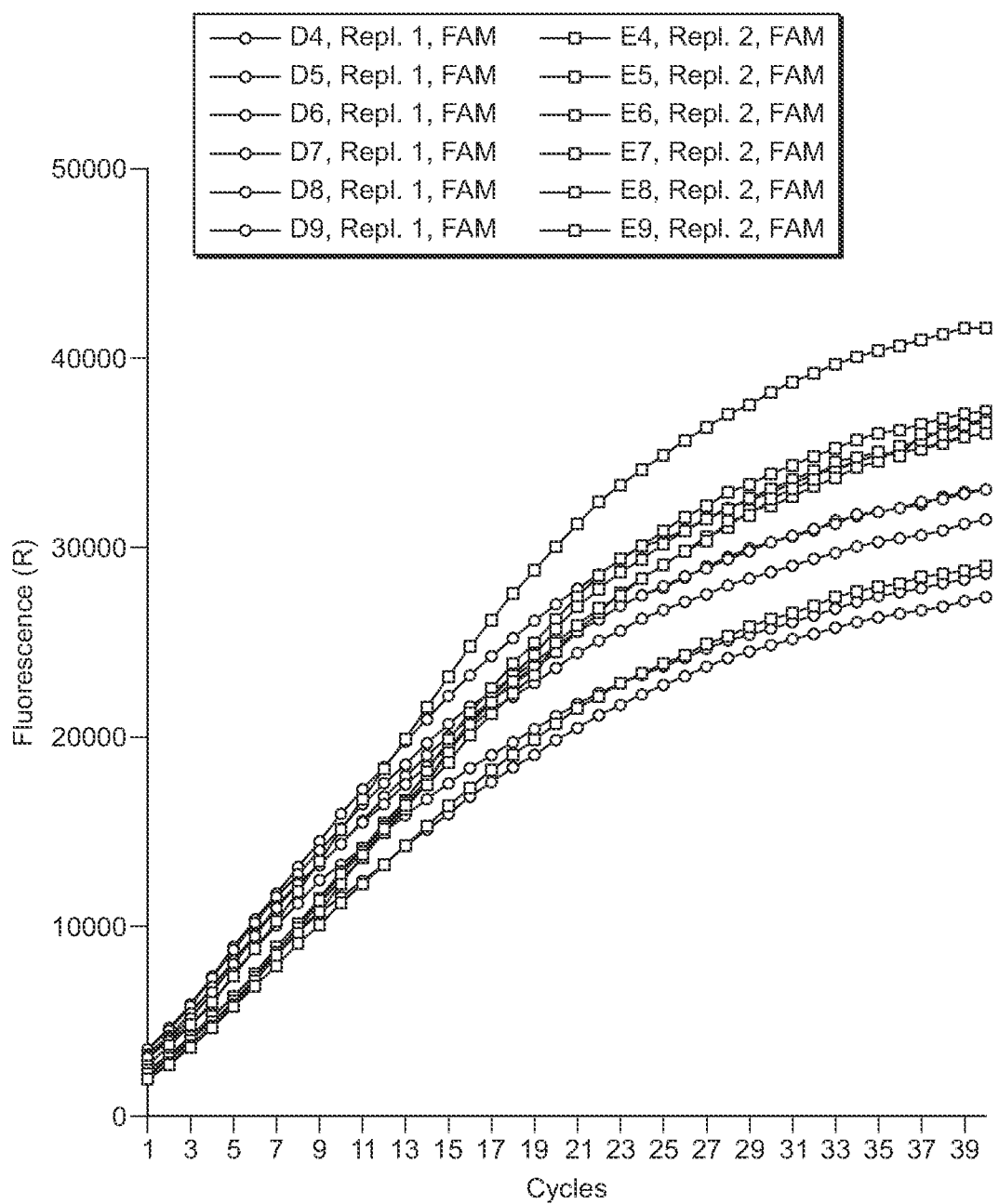

FIG. 4a shows the average polymerase activity assay with and without rubidium sulfate. The Figure shows that rubidium sulfate does not change the activity of the polymerase in any significant manner: the control results (no added rubidium) are closely similar to those obtained in the presence of 15 mM rubidium. FIG. 4b shows the six replicates for +/− rubidium. None of the replicates shows a significant difference, indicating that the improvement seen in the STAR reaction is not due to rubidium acting on the polymerase.

Example 4: Results Using Nicking Enzyme Activity Assay

Figure 5:
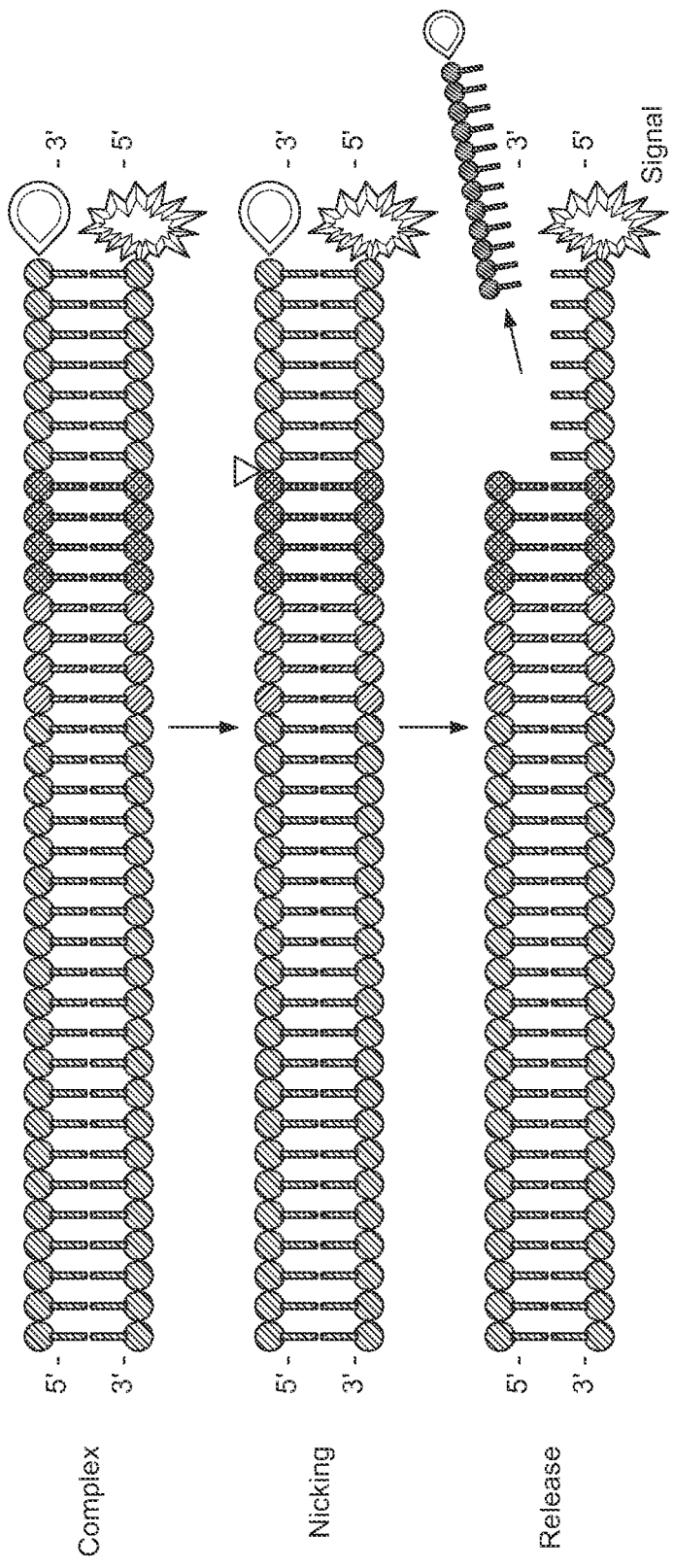
FIG. 5 is a schematic representation of the Nicking Enzyme Activity Assay ("NAA") performed by the inventors.

Nicking Activity Assay (NAA) Design, Enzymes, and Oligonucleotides:

Synthetic oligonucleotides for the nicking activity assay were synthesized by Integrated DNA Technologies (Coralville, IA). The design consists of two oligonucleotides; the template oligo (NEQ), (SEQ ID NO: 7 5'-ACCGCGCGCACCGAGTCTGTCGGCA/3BHQ_1/-3') and priming oligo (POF, SEQ ID NO: 8 5'-/56-FAM/CTGCCGACAGACTCGGTGCGCGCGGT-3"). Together these oligonucleotides form a complex in solution each with unique functions, as shown in FIG. 5. The template oligo has a nicking site for nicking endonuclease activity and downstream a 3' quencher. The priming oligo has the complementary nicking site sequence and a 5' fluorophore. When in solution the two form a complex that completes a nicking binding site allowing for the nicking endonuclease to cut. The oligonucleotide quencher 5' of the nick site, following a nick by a nicking endonuclease, now has a low melting temperature. Because the reaction is performed above this melting temperature, the shortened fragment containing the quencher is released from the complex generating fluorescence. The more active the nicking enzyme the faster and greater the florescent signal is generated.

Nicking Activity Assay Conditions

The basic NAA mixture contained the template oligo (NEQ) with a 3' modification, and the priming oligo (POF) with a 5'-FAM modification which anneals to the template, and a nicking endonuclease (referenced above). The reactions were performed in a final volume of 25 μl, including 1.3 μM NEQ, 1.6 μM POE, and 1×NAA Master Mix. At a 1× concentration, the NAA master mix contained the following reagents; 12.5 mM $MgSO_4$, 90 mM Tris-HCl (pH 8.5), 15 mM $NH_4CH_3CO_2$, 15 mM $Na_2SO_4$, 5 mM DTT, 0.2 mg/ml BSA, 0.02% Triton X-100, 15 mM $Rb_2SO_4$, 10 mM L-Threonine, and 0.008 U/μl nicking endonuclease. The reactions were run using a STAR temperature profile as previously described (Example 1). The NAA was performed with the Agilent Mx3005P qPCR apparatus (Agilent). Every reaction had a pre-reaction incubation to allow the reagents to come to temperature to test the effect of the selected temperature profile and occlude any variation as reactions heated up. Each reaction assessed amplification kinetics, enzyme performance, and signal fluorescence.

Figure 6A:
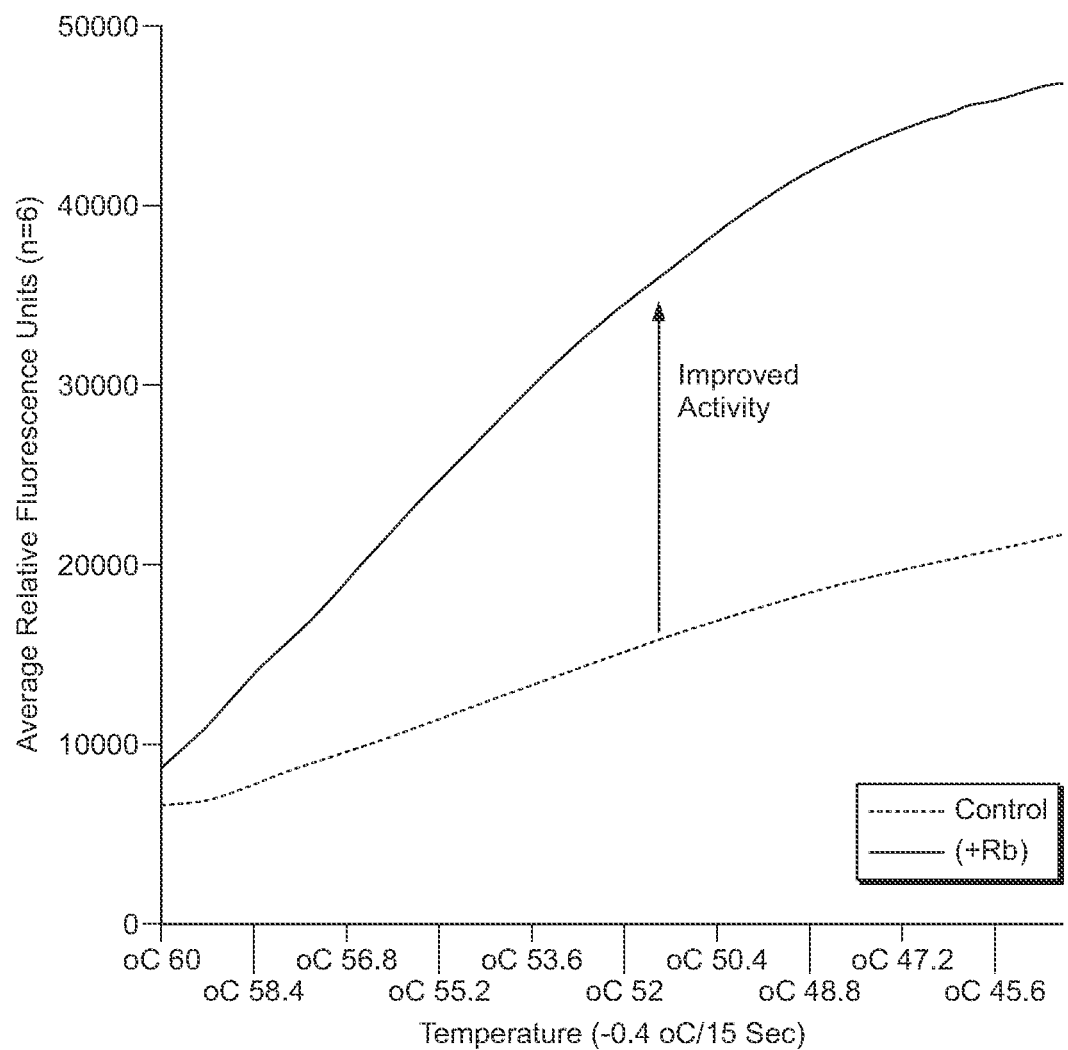
FIG. 6a is a graph of average relative fluorescence (arbitrary units) against instantaneous temperature (° C.) (i.e. the temperature of the sample at the time the fluorescence reading was taken)
Figure 6B:
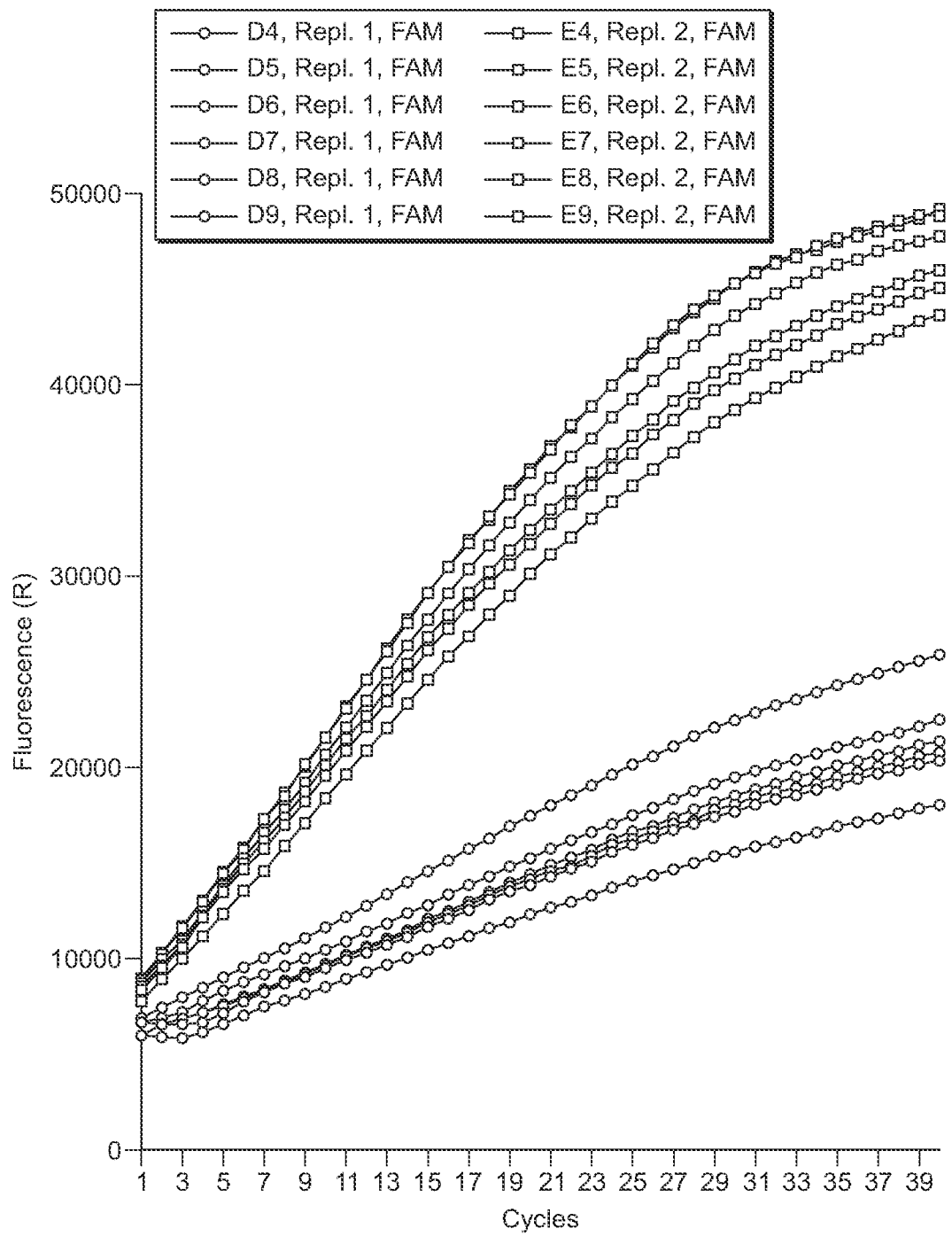
FIG. 6b is a graph of relative fluorescence (arbitrary units) against amplification cycle number.

FIG. 6a shows the average nicking enzyme activity with and without rubidium sulfate. The Figure shows that, surprisingly, rubidium sulfate significantly increased the activity of the nicking enzyme. FIG. 6b shows the six replicates for each condition. All of the replicates showed markedly increased nicking enzyme activity in the presence of rubidium (replicates E4-E9) compared to results in the absence of rubidium (replicates D4-D9). This is an unexpected result, as it has not been previously reported that rubidium could increase the activity of a nicking endonuclease. Not to limit the applicants to any particular theory, this would further explain the improvements observed in Examples 1 & 2, indicating that the exponential phase of amplification is improved, generating faster product turnover.

Example 5: Results of Ion Replacement in STAR

Figure 7:
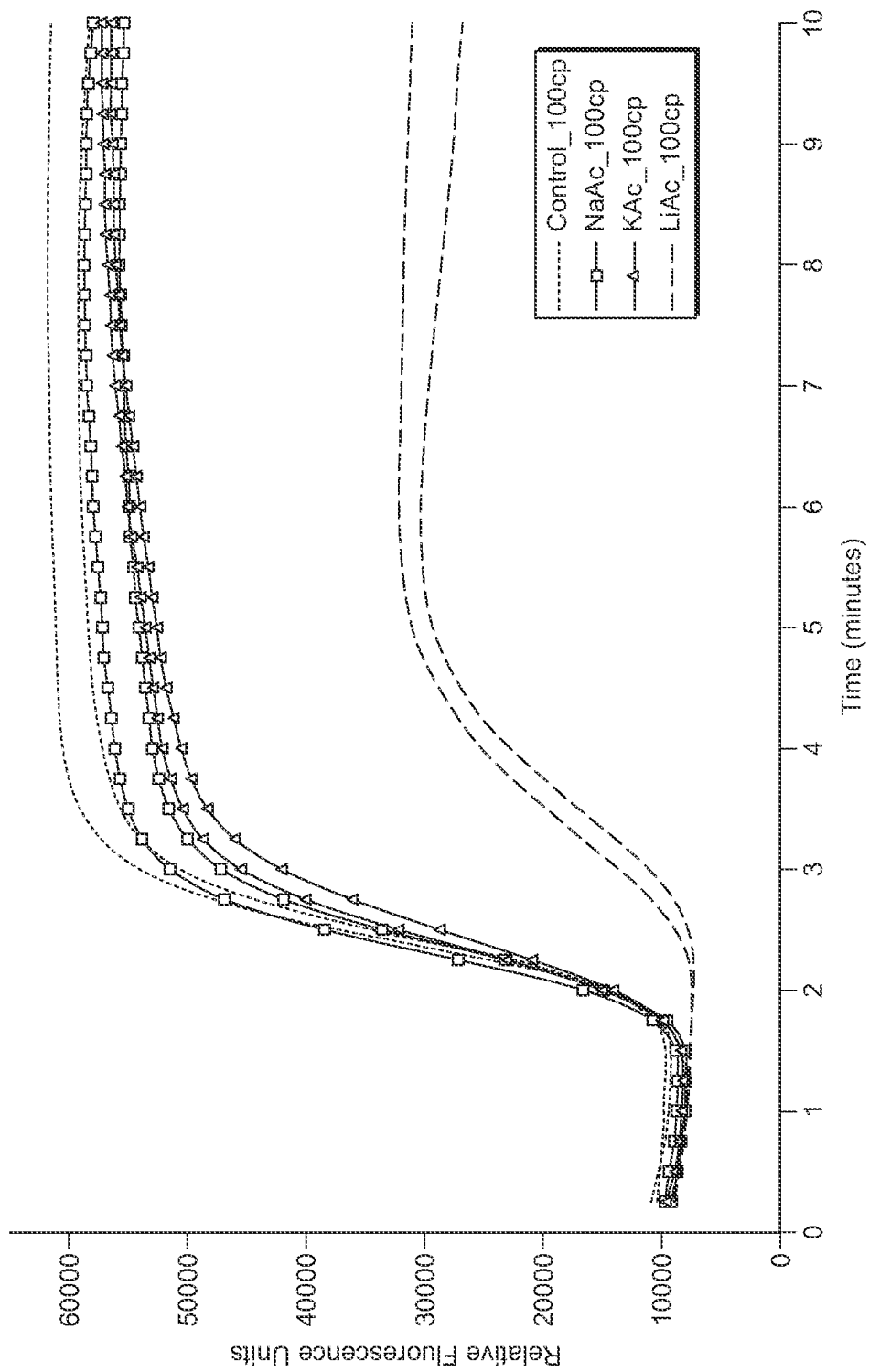
FIGS. 7-9 are graphs of relative fluorescence (arbitrary units) against time (minutes) showing the results of STAR DNA amplification assays performed in the presence of various alkali or alkaline earth metal salts other than those of rubidium.
Figure 8:
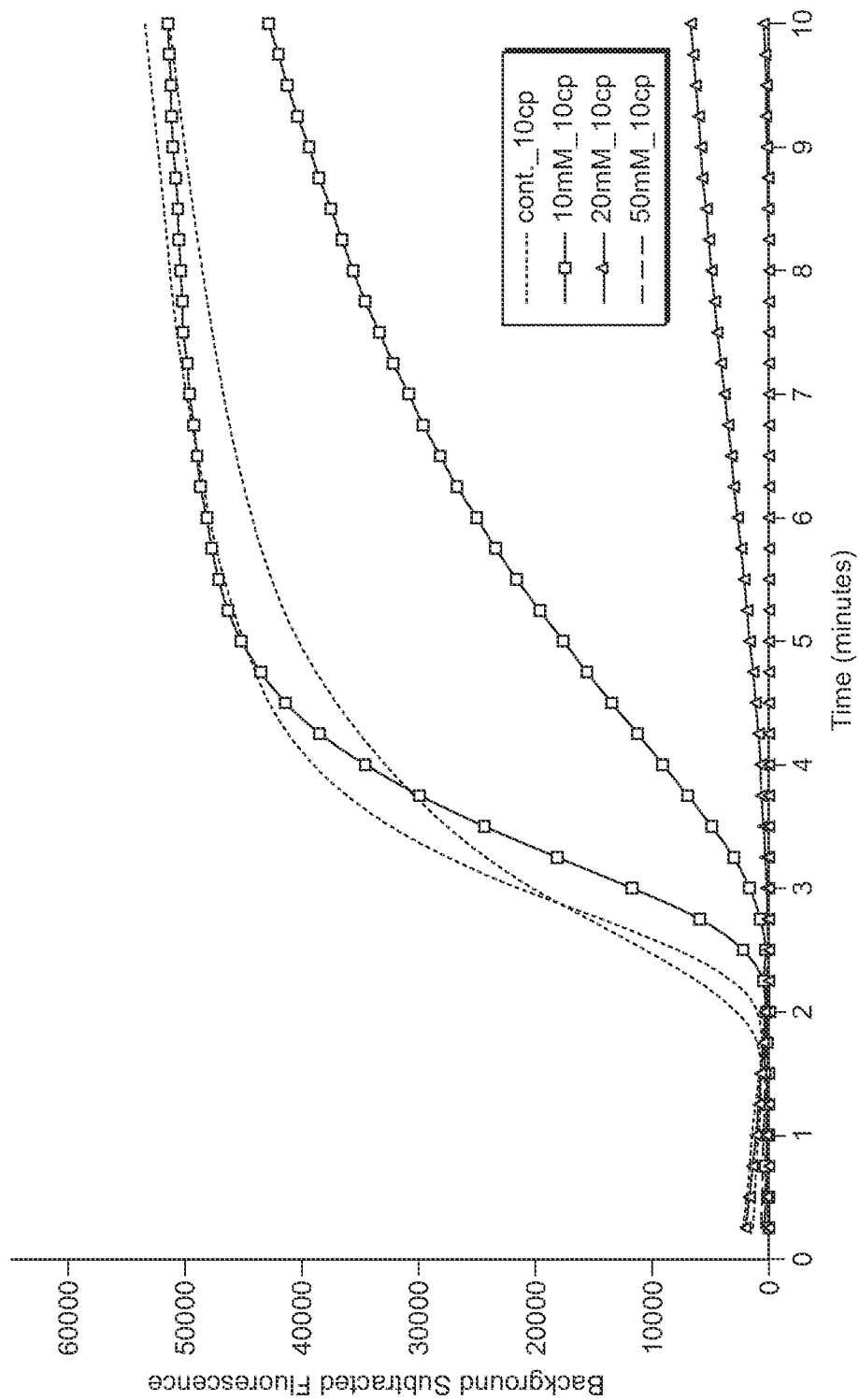
Figure 9:
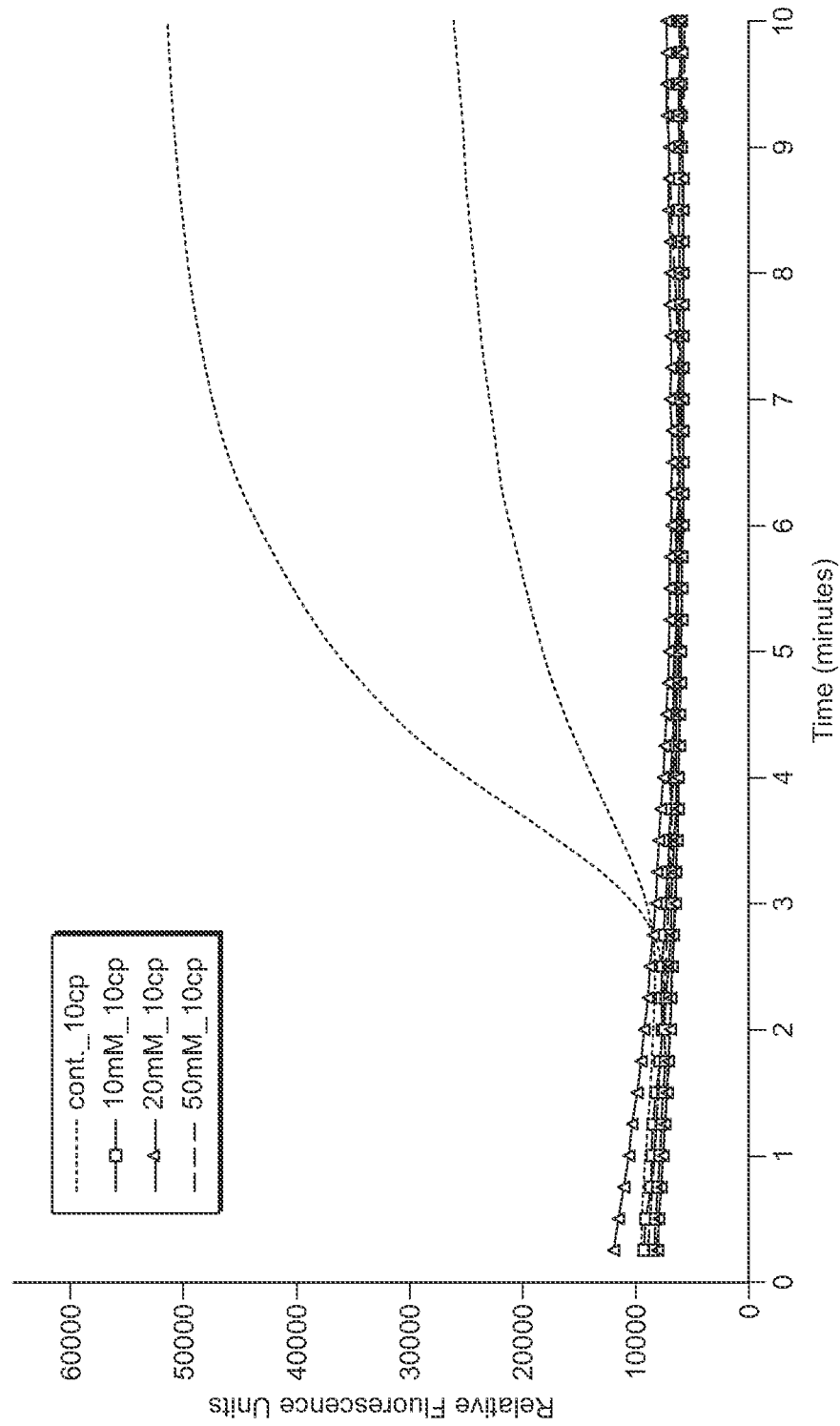

The unexpected improvement of the nicking enzyme by rubidium suggests that other readily available alkali and alkaline earth metals should be tested to determine if they improved the activity of the nicking endonuclease. Different salts were replaced in various buffer combinations and their effects on STAR were determined. The following salts were tested at various concentrations; lithium acetate, potassium acetate, lithium sulfate, strontium chloride, strontium acetate, scandium acetate, and yttrium acetate. FIG. 7 shows results obtained with lithium and potassium acetate, neither of which improved STAR, with lithium possibly inhibiting the reaction, slowing it down. FIG. 8 shows the results for strontium acetate: 10 mM possibly slightly slowed the reaction, while 20 and 50 mM fully inhibited the reaction. FIG. 9 shows the results for scandium acetate: all concentrations fully inhibited the reaction. For brevity the results from the other tested salts are not shown as none of them improved the STAR reaction, and most fully inhibited the reaction, further supporting the surprising nature of the results obtained with rubidium.

Example 6: Results in a Modified Nicking Enzyme Activity Assay (NAA) with Other Nicking Enzymes To demonstrate that rubidium improves the activity of nicking endonucleases other than Nt.BstNBI, a modified NAA was performed using the nicking endonuclease Nb.BsmI, purchased from New England BioLabs (Ipswich, MA). The modified NAA was run with and without rubidium using the following conditions.

Nicking Activity Assay (NAA) Design, Enzymes, and Oligonucleotides:

Synthetic oligonucleotides for the modified nicking activity assay were synthesized by Integrated DNA Technologies (Coralville, IA). The design consists of the following oligonucleotide: the Probe Oligo (DLPFQ) (SEQ ID NO: 9 5'-/56-FAM/CACTTGGCATTCTATTA-CACAATAGAATGCCAAGTG/3BHQ_1/-3"). The Nb.BsmI recognition sequence is GAATG_CN. (The underscore indicates the nick site). The oligonucleotide contains self-complementary sequences and forms a molecular beacon-like probe in solution. The probe has a nicking site for nicking endonuclease activity and a 3' quencher. Upstream of the nicking binding site is a 5' fluorophore. When in solution a complex is formed that completes a nicking binding site allowing for the nicking endonuclease to nick. Nb.BsmI is a bottom cutter and therefore will cut on the opposite strand of the nicking binding site. The oligonucleotide quencher 3' of the nick site, following a nick by a nicking endonuclease, now has a low melting temperature. Because the reaction is performed above this melting temperature, the shortened fragment containing the quencher is released from the complex, generating fluorescence. The more active the nicking enzyme the faster and greater the florescent signal is generated.

Nicking Activity Assay Conditions

The basic NAA mixture contained the probe oligo (DLPFQ) with a 5'-FAM modification and a 3'-BHQ1 modification which folds on itself, and a nicking endonuclease (referenced above). The primer sequences are the same as those detailed in Example 1. The reactions were performed in a final volume of 25 μl, including different concentrations of DLPFQ depending on the nicking enzyme used, and 1×NAA Master Mix. At a 1× concentration, the NAA master mix contained the following reagents; 12.5 mM $MgSO_4$, 90 mM Tris-HCl (pH 8.5), 15 mM $NH_4CH_3CO_2$; 15 mM $Na_2SO_4$, 5 mM MT, 0.2 mg/ml BSA, 0.02% Triton X-100, 20 mM $Rb_2SO_4$, 10 mM L-Threonine, and a range from 0.01 to 0.5 U/μl nicking endonuclease. The reactions are run using a STAR temperature profile as previously described (Example 1). The modified NAA was performed with the Agilent Mx3005P qPCR apparatus (Agilent). Every reaction had a pre-reaction incubation to allow the reagents to come to temperature to test the effect of the selected temperature profile and occlude any variation as reactions heated up. Each reaction assessed kinetics, enzyme performance, and signal fluorescence.

Figure 10:
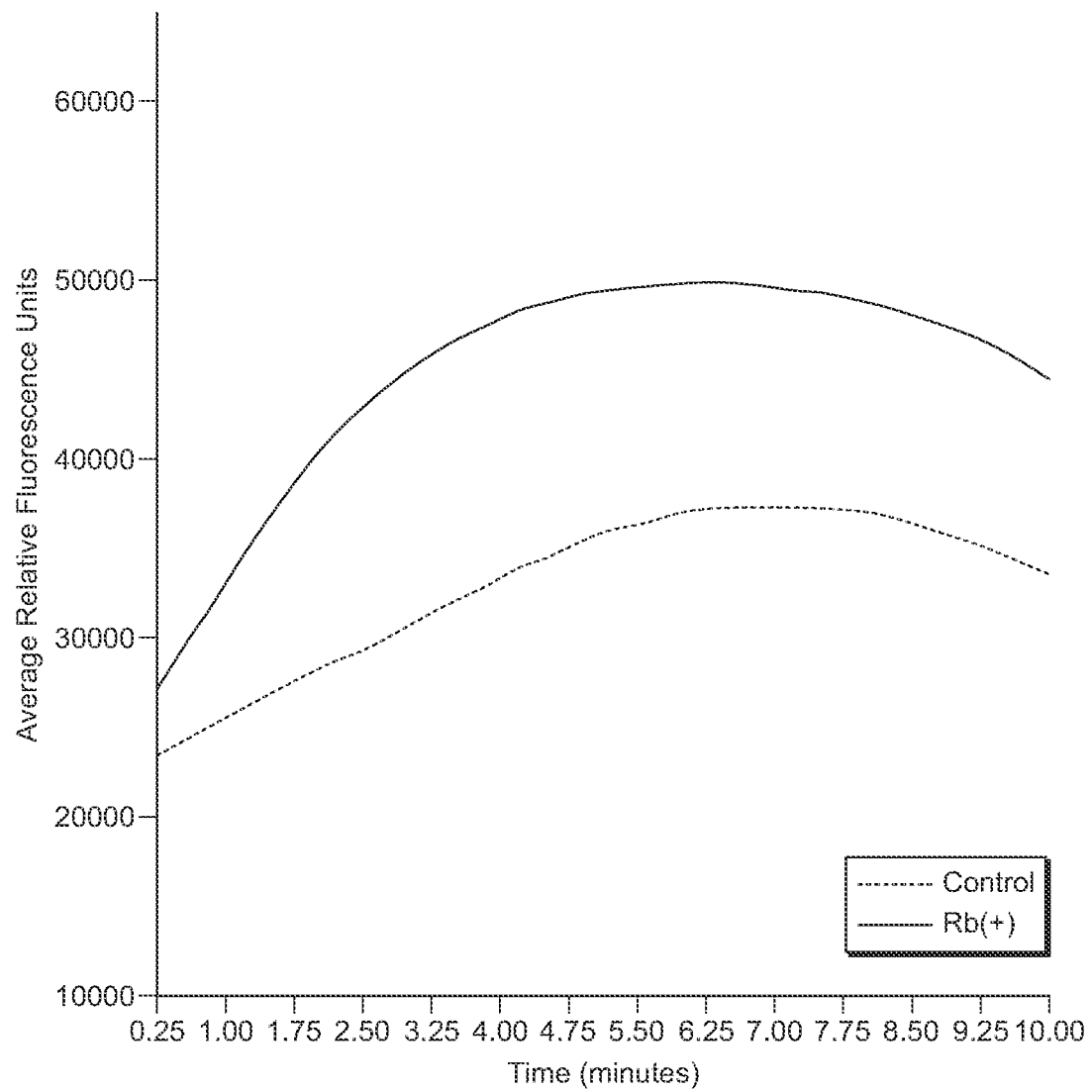
FIG. 10 is a graph of average relative fluorescence (arbitrary units) against time (minutes) showing the results of a NAA performed by the inventors using the nicking enzyme Nb.BsmI in the absence (dotted line, control) or presence (solid line) of 20 mM rubidium sulfate.

FIG. 10 shows the results obtained from an average of six replicates of nicking enzyme activity assays with and without rubidium sulfate. The data show that rubidium sulfate increases the activity of this other nicking endonuclease.

Example 7: Results in Isothermal Amplification

Rubidium may be employed in any amplification technology thus, for example, the amplification process may be based on the amplification process employed in strand displacement amplification, or based on that used in NEAR or indeed any other nucleic acid amplification process which relies on the creation of a single stranded nick and subsequent extension from the 3' end of the nicked strand. Accordingly, the teachings of the prior art in relation to the amplification stages of SDA or NEAR will, in general, be equally applicable to the amplification process of the method of the present invention.

Amplification Conditions and Procedure

The basic mixture contains two primers, polymerase, and nicking enzyme (referenced above). The primer sequences are the same as those detailed in Example 1. The reactions were performed in a final volume of 25 µM, including 1.0 µM of the forward primer, 0.5 µM of the reverse primer, 0.25 µM molecular beacon, 10 µM Master Mix and 5 µl DNA sample. The master mix contained the following reagents; 12.5 mM MgSO$_4$, 90 mM Tris-HCl (pH 8.5), 300 µM each dNTPs, 40 mM NH$_4$OAc, 15 mM Na$_2$SO$_4$, 2 mM DTT, 0.01% Triton X-100, 15U nicking endonuclease, 60 U polymerase. The temperature of the reaction was isothermal, as described in US2009/0017453. Amplification and product detection were performed with the Agilent Mx3005P qPCR apparatus (Agilent).

Every reaction had a pre-incubation to allow the reagents to come to reaction temperature and to test the effect that salts had on amplification kinetics, enzyme performance, and signal fluorescence.

Results

Figure 11:
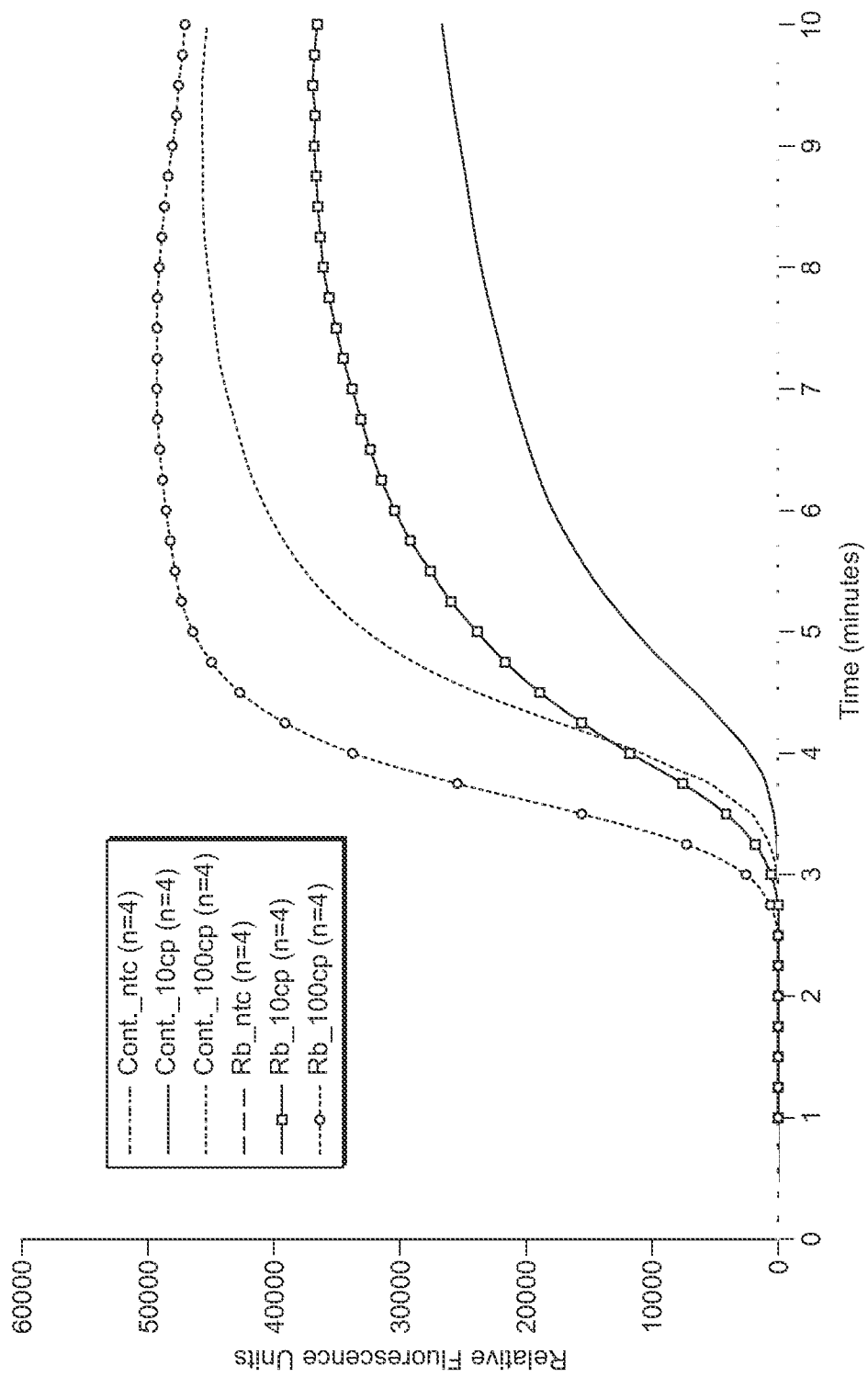
FIG. 11 is a graph of relative fluorescence (arbitrary units) against time (minutes) showing the results of an isothermal "NEAR" DNA amplification reaction performed in the absence ("cont.") or presence ("Rb") of 20 mM rubidium sulfate.

The results in FIG. 11 show the average of 4 replicates of isothermal amplification runs at 100 copies and 10 copies template with and without 20 mM rubidium sulfate ("ntc"=no template control). From the data in the figure, it is evident that rubidium sulfate improves the isothermal reaction, 15 mM of rubidium sulfate made the 10 copy reaction perform similar to the 100 copy reaction without rubidium sulfate. For brevity the replicates for the data are not shown, but the inventors found that the replicates with rubidium were tighter than without rubidium.

Example 8: Nicking Enzyme Crystal Structure

Figure 12:
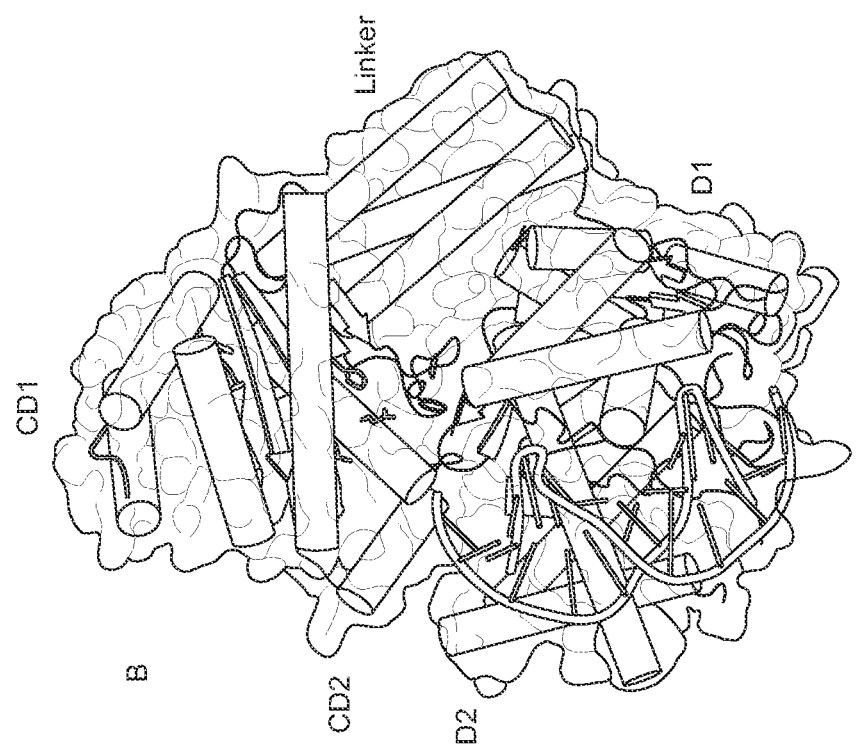
FIG. 12A is a computer-generated model of the domain architecture of the nicking enzyme N.BspD6I.
FIG. 12B shows a surface fill representation superimposed on the model.
Figure 12:
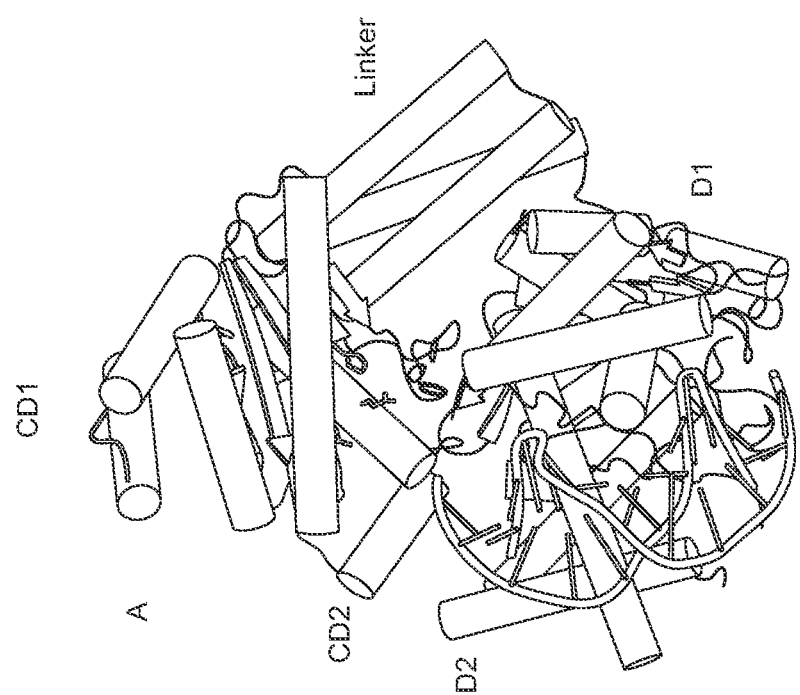
Figure 13:
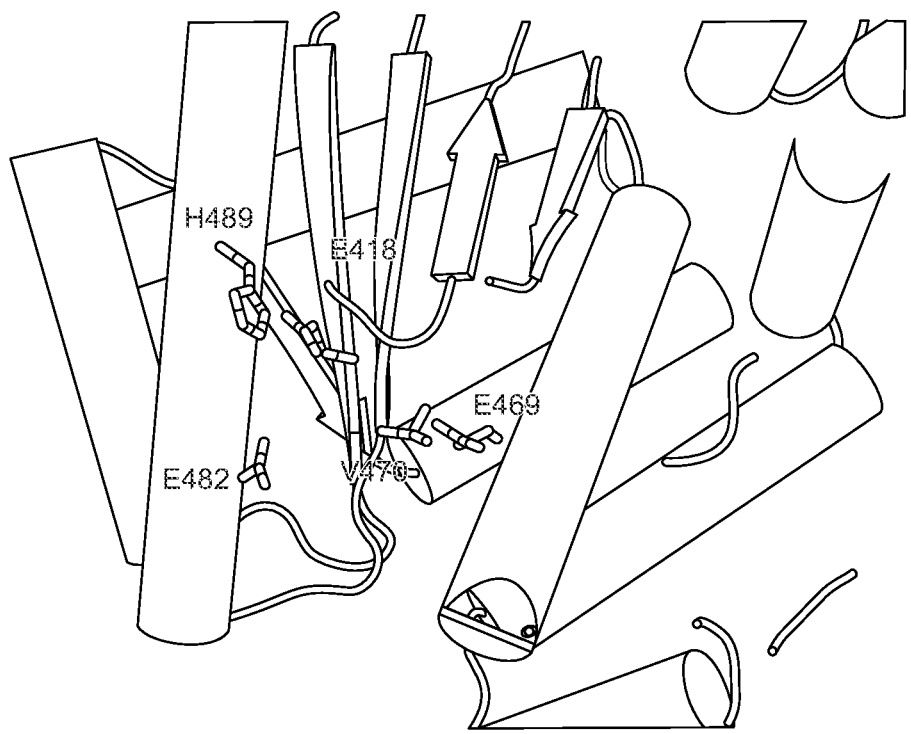
FIG. 13 is a computer-generated model of the putative active site of N.BspD6I.
Figure 14:
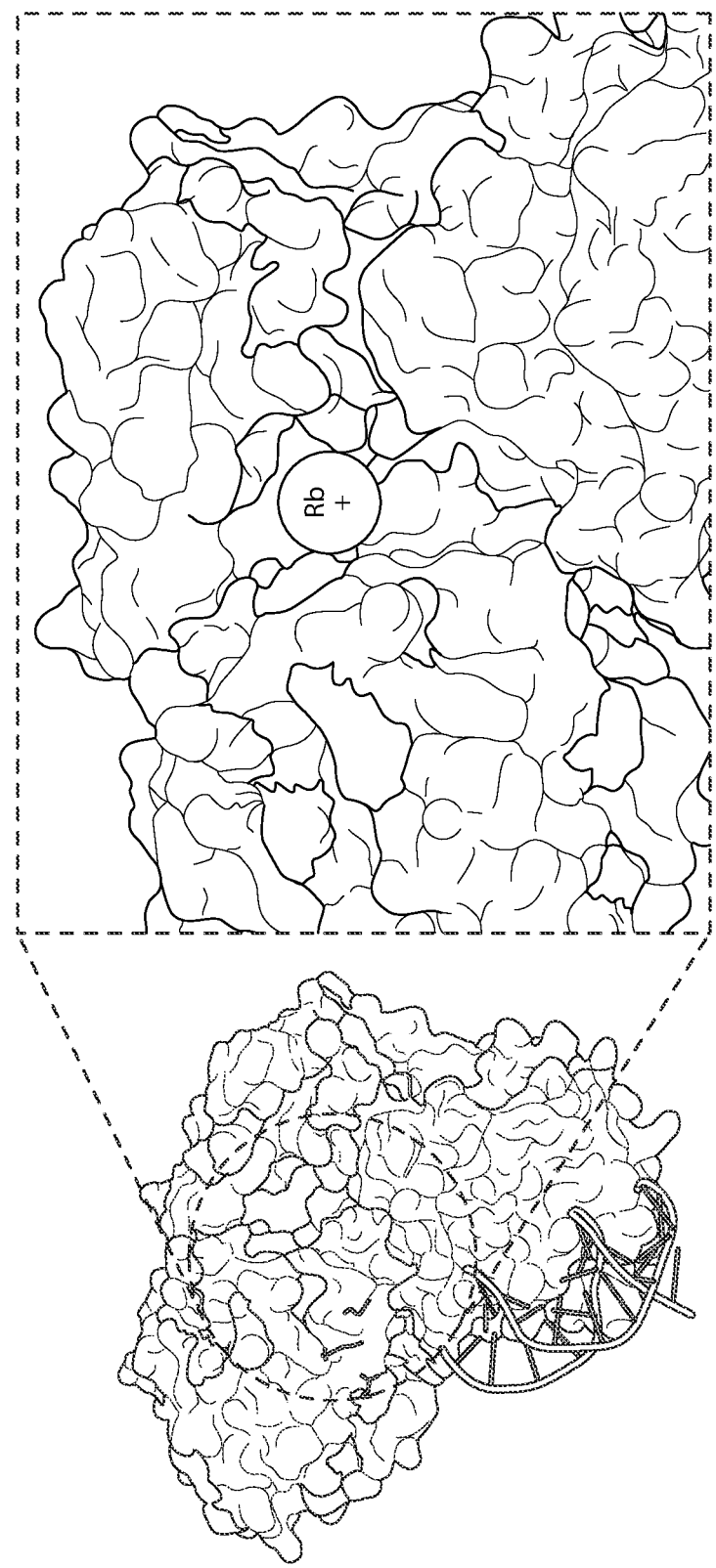
FIG. 14 shows a computer-generated model of a putative allosteric site on the surface of N.BspD6I with a potential binding pocket for a rubidium ion.

After the empirical data previously referenced was generated, further analysis of the crystal structure of the nicking enzyme was undertaken. Not to limit the applicants to any particular theory, FIG. 12 shows the domain architecture of the nicking enzyme N.BspD6I (Protein Data. Bank ("PDB") ID 2EWF) modeled with a bound DNA recognition motif from PDB ID 2VLA as referenced in Kachalova et al., 2008. The overall architecture has been described and is shown here in several subdomains: a DNA binding domain made up of D1 and D2, and a linker that joins the catalytic c-terminal domain composed of subdomains CD1 and CD2. A surface fill representation is shown superimposed on the cartoon model in FIG. 12 B. FIG. 13 shows the putative active site displaying residues E482, E418, V470, H489, and E469. A speculative binding site for rubidium (shown by E418, E482, or E469) identified by rubidium's radius of hydration versus magnesium or sodium (1.6Arb+ versus 1.3NMg++ to 1.1 Na+) may lend greater stability to the nicking enzyme's folding within the local environment and/or stabilize the catalytic domain allowing for more efficient activity of key residues that are critical to the function of the enzyme. Additionally, in FIG. 14, at the surface of the nicking enzyme, a potential solvent exposed pocket is made up of CD linker and D1 domains. Rubidium may act as a speculative allosteric co-factor in this pocket and enhance overall activity. The many glutamic and aspartic acid residues in this pocket can contribute to rubidium binding (residues E364, E335, E368, D341, D357, E353, E305, E327). However, a cluster of glutamic acid residues most proximal to the active site likely chelate rubidium (residues E364, E335, E368).

Example 9: Results in Licking Enzyme Activity Assay (NAA) with Third Nicking Enzyme Under Isothermal Condition To demonstrate that rubidium improves the activity of a third nicking endonuclease a modified NAA was run using the nicking endonuclease, Nb.BbvCI, purchased from New England BioLabs (Ipswich, MA). A NAA was run with and without rubidium using the following conditions.

Nicking Activity Assay (NAA) Design, Enzymes, and Oligonucleotides:

Synthetic oligonucleotides for the nicking activity assay were synthesized by Integrated DNA Technologies (Coralville, IA). The assay comprises use of the following oligonucleotide probe (DLPFQ) (SEQ ID NO: 10 5'/56-FAM/CATGCTGAGGAATATTA.CACAATATTCCTCAGCATG/3BHQ_1/-3'). The oligonucleotide forms a molecular beacon-like probe in solution. The probe has a nicking site for nicking endonuclease activity and a 3' quencher. Upstream of the nicking enzyme binding site is a 5' fluorophore. When in solution a complex is formed that completes a nicking binding site allowing for the nicking endonuclease to cut, this nicking enzyme is a bottom cutter and therefore will cut on the opposite strand from the nicking binding site. The oligonucleotide quencher 3' of the nick site, following a nick by a nicking endonuclease, now has a low melting temperature. Because the reaction is performed above this melting temperature, the shortened fragment containing the quencher is released from the complex generating fluorescence. The more active the nicking enzyme the faster and greater the florescent signal is generated.

Nicking Activity Assay Conditions

The basic (NAA) mixture contains the probe oligo (DLPFQ) with a 5'-FAM modification and a 3'-BEIQ1 modification which folds on itself, and a nicking endonuclease (referenced above). The reactions were performed in a final volume of 25 µl, including different concentrations of POFQ depending on the Nicking Enzyme used, and 1× NA A Master Mix. At a 1× concentration, the NAA master mix contains the following reagents; 40 ml RbCl, 1× CutSmart Buffer purchased from New England BioLabs (Ipswich, MA), and a range from 0.01 to 0.5 U/µl nicking endonuclease. The reactions are run using an isothermal temperature profile, 50° C. The NAA was performed with the Agilent Mx3005P qPCR apparatus (Agilent). Every reaction had a pre-reaction incubation to allow the reagents to come to temperature to test the effect of the selected temperature profile and occlude any variation as reactions heated up. Each reaction assessed kinetics, enzyme performance, and signal fluorescence.

Figure 15:
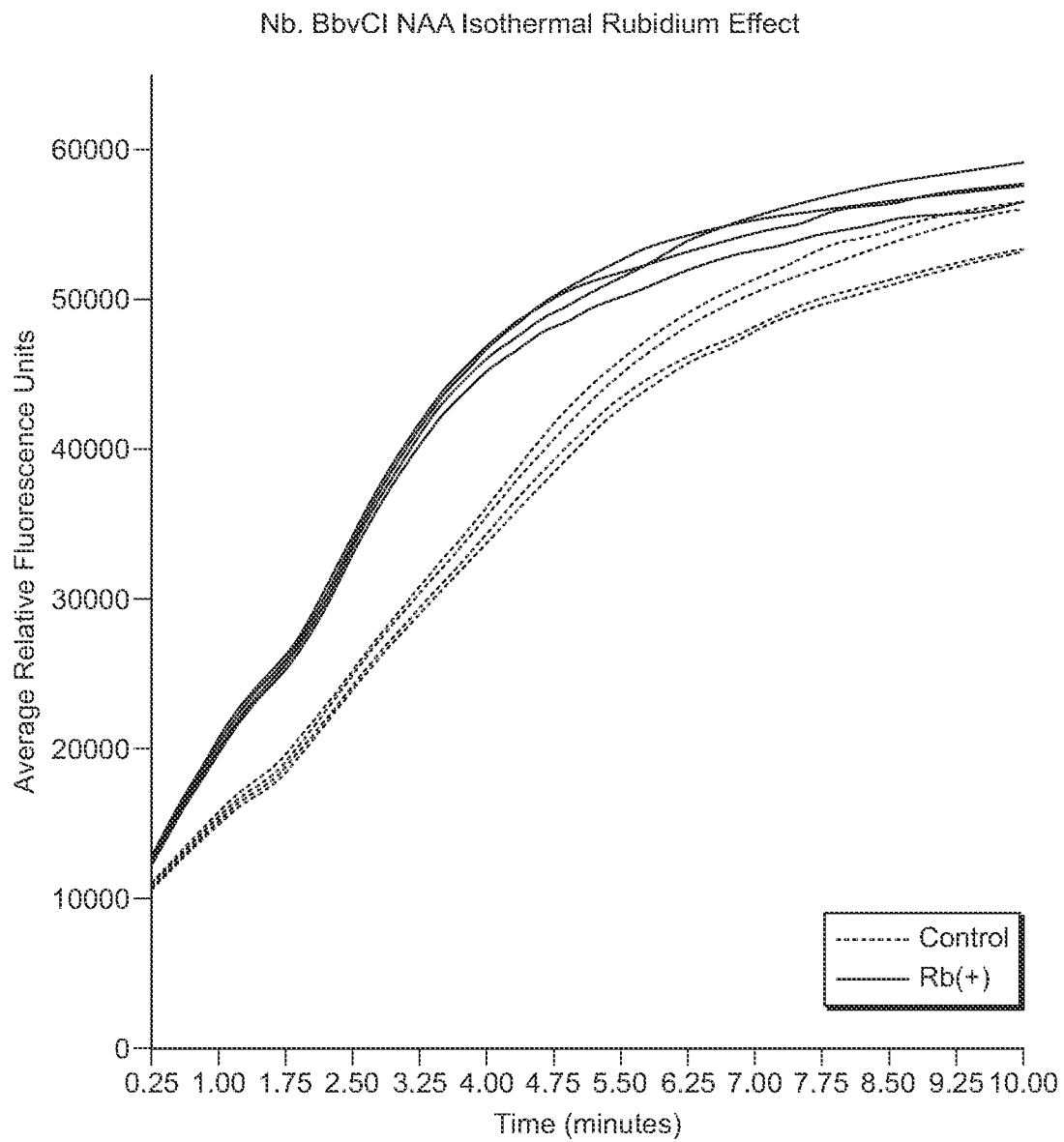
FIG. 15 is a graph of relative fluorescence (arbitrary units) against time (minutes) for a NAA using the nicking enzyme Nb.BbvCI in the presence or absence of rubidium chloride.

FIG. 15 is a graph of average relative fluorescence units (a measure of nicking enzyme activity in the NAA) against time (in minutes). The graph shows the results for four replicate samples in the NA assay with rubidium (solid lines) or without (dotted lines, control). The data shows that rubidium chloride increases the activity of Nb.BbvCI nicking endonuclease under isothermal conditions.

The invention claimed is:

1. A composition comprising a nicking enzyme and a water-soluble rubidium salt in an effective amount to improve the activity of the nicking enzyme.

2. The composition according to claim 1, wherein the rubidium salt is selected from the group consisting of: rubidium sulfate, a rubidium halide and rubidium nitrate.

3. The composition according to claim 2, wherein the rubidium halide is rubidium chloride.

4. The composition according to claim 1, wherein the nicking enzyme is selected from the group consisting of: Nb.BsmI, Nb.Bts, Nt.AlwI, Nt.BbvC, Nt.BstNBI and Nt.Bpu10I.

5. The composition according to claim 1, provided in dry form.

6. The composition according to claim 1, provided as an aqueous solution.

7. The composition according to claim 1, further comprising a pH buffer substance.

8. The composition according to claim 7, wherein the pH buffer substance is selected from the group consisting of: Trishydrochloride, Tris hemisulfate, Tris EDTA, Tris Base, Tris EGTA, N,N-Bis(2-hydroxyethyl)glycine, N,N-Bis(2-hydroxyethyl)-3-amino-2-hydroxypropanesulfonic acid, 4-(2-hydroxyethyl)-1-piperazinepropanesulfonic acid, N-(2-hydroxyethyl)piperazine-N'-(4-butanesulfonicacid),4-(2-hydroxyethyl)piperazine-1-ethanesulfonic acid, orthoboric acid, 3-(N-Morpholino)propanesulfonic acid hemisodium salt, 3-(N-Morpholino)propanesulfonic acid sodium salt, 3-(N-Morpholino)propanesulfonic acid, Piperazine-1,4-bis (2-hydroxypropanesulfonic acid) dihydrate, N-[Tris(hydroxymethyl)methyl]-3-aminopropanesulfonic acid, 3-(N-tris[hydroxymethyl]methylamino)-2-hydroxypropanesulfonic acid, N-[Tris(hydroxymethyl)methyl]glycine, sodium chloride, sodium sulfate, sodium acetate, sodium hydride, sodium nitrite, sodium nitrate, sodium borate, boric acid, potassium sulfate, potassium acetate, potassium borate, potassium chloride, potassium nitrite, potassium nitrate, magnesium sulfate, magnesium chloride, magnesium acetate, ammonium chloride, ammonium sulfate, ammonium acetate, ethylenediaminetetraacetic acid, ethylene glycol-bis(2-aminoethylether)-N,N,N',N'-tetraacetic acid, citric acid, or a combination thereof.

9. The composition according to claim 1, comprising a carbohydrate.

10. The composition according to claim 9, wherein the carbohydrate is selected from the group consisting of: fructose, Ficoll®, hydroxyethyl (heta) starch, pentosan polysulfate, polyphosphoric acid, poly-L-glutamic acid, sucrose, trehalose, maltotriose, dextrans, mannitol, sorbitol, glucose, mannose, galactose, lactose, maltose, lactulose, raffinose, melezitose, 1,6-anhydroglucose, k-carrageenan, microcrystalline cellulose, polyethylene glycols, polyvinylpyrrolidone, leucrose, kestose, stachyose, verbascose, nystose, maltodextrin, cyclodextrins, isomaltooligosaccharide, fructooligosaccharides, inulin, or a combination thereof.

11. The composition according claim 1, wherein the composition is other than the composition or aqueous solution consisting of 12.5 mM $MgSO_4$, 90 mM Tris-HCl (pH 8.5), 15 mM $NH_4CH_3CO_2$, 15 mM $Na_2SO_4$, 5 mM DTT, 0.2 mg/ml BSA, 0.02% Triton X-100, 20 mM $Rb_2SO_4$, 10 mM L-threonine, and 0.008 U/µl nicking enzyme.

12. The composition according to claim 1, wherein the composition is other than a composition comprising 12.5 mM $MgSO_4$, 90 mM Tris-HCl (pH 8.5), 15 mM $NH_4CH_3CO_2$, 15 mM $Na_2SO_4$, 5 mM DTT, 0.2 mg/ml BSA, 0.02% Triton X-100, 20 mM $Rb_2SO_4$, 10 mM L-threonine, and 0.008 U/µl nicking enzyme in combination with one or more additional constituents.

13. A kit for performing a nucleic acid amplification reaction, the kit comprising a package and, within the package, one or more aliquots of the composition according to claim 1.

14. A lateral flow or microfluidic device comprising a measured amount of the composition according to claim 1.

15. A method for performing a reaction catalysed by a nicking enzyme, the method comprising the step of contacting a nicking enzyme with a double stranded polynucleotide substrate having a recognition site for the nicking enzyme, in the presence of a water-soluble rubidium salt in an effective amount to improve the activity of the nicking enzyme, in aqueous conditions compatible with the nicking enzyme, so as to effect at least one single-stranded nick or cut in the double stranded polynucleotide substrate.

16. The method according to claim 15, wherein the single-stranded nick in the substrate is made in conditions other than in an aqueous solution comprising the following constituents at the recited concentration: 12.5 mM $MgSO_4$, 90 mM Tris-HCl (pH 8.5), 15 mM $NH_4CH_3CO_2$, 15 mM $Na_2SO_4$, 5 mM DTT, 0.2 mg/ml BSA, 0.02% TritonX-100, 20 mM $Rb_2SO_4$, 10 mM L-threonine, and 0.008 U/µl nicking enzyme.

17. The method according to claim 15, wherein the reaction catalysed by the nicking enzyme is part of or comprised within a nucleic acid amplification reaction.

18. A reaction mixture for performing a reaction comprising the nicking of a double stranded oligonucleotide or polynucleotide substrate, the reaction mixture comprising: a nicking enzyme; a double stranded oligonucleotide or polynucleotide substrate; and a water-soluble rubidium salt in an effective amount to improve the activity of the nicking enzyme.

19. The reaction mixture according to claim 18, wherein the rubidium ion is present in solution at a concentration in the range 10-50 mM, more preferably 10-30 mM.

20. The reaction mixture according to claim 18, wherein the nicking enzyme is not a "V"-type nicking enzyme.

21. The reaction mixture according to claim 18, further comprising at least one buffer agent.

22. The reaction mixture according to claim 18, further comprising nucleotide triphosphates and a DNA polymerase.

23. The reaction mixture according to claim 18, other than a reaction mixture comprising 12.5 mM $MgSO_4$, 90 mM Tris-HCl (pH 8.5), 15 mM $NH_4CH_3CO_2$, 15 mM $Na_2SO_4$, 5 mM DTT, 0.2 mg/ml BSA, 0.02% Triton X-100, 20 mM $Rb_2SO_4$, 10 mM L-threonine, and 0.008 U/µl nicking enzyme.

24. The reaction mixture according to claim 22, wherein the DNA polymerase has strand-displacement activity.

\* \* \* \* \*

SEQUENCE LISTING

<160> NUMBER OF SEQ ID NOS: 10

<210> SEQ ID NO 1

```
<211> LENGTH: 34
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 1
cgactccata tggagtcgat ttccccgaat tamg                                 34

<210> SEQ ID NO 2
<211> LENGTH: 34
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 2
ggactccaca cggagtcctt tttccttgtt tamc                                 34

<210> SEQ ID NO 3
<211> LENGTH: 33
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 3
ccattccttg tttactcgta tttttaggaa tgg                                  33

<210> SEQ ID NO 4
<211> LENGTH: 33
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 4
accgcgcgca ccgagtctgt cggcagcacc gct                                  33

<210> SEQ ID NO 5
<211> LENGTH: 16
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 5
agcggtgctg ccgaca                                                     16

<210> SEQ ID NO 6
<211> LENGTH: 12
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 6
ggtgcgcgcg gt                                                         12

<210> SEQ ID NO 7
<211> LENGTH: 25
```

```
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 7
accgcgcgca ccgagtctgt cggca                                          25

<210> SEQ ID NO 8
<211> LENGTH: 26
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 8
ctgccgacag actcggtgcg cgcggt                                         26

<210> SEQ ID NO 9
<211> LENGTH: 36
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 9
cacttggcat tctattacac aatagaatgc caagtg                              36

<210> SEQ ID NO 10
<211> LENGTH: 36
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 10
catgctgagg aatattacac aatattcctc agcatg                              36
```